United States Patent
Mitsumori

(10) Patent No.: US 8,923,291 B2
(45) Date of Patent: Dec. 30, 2014

(54) COMMUNICATION APPARATUS AND COMMUNICATION METHOD

(71) Applicant: Fujitsu Limited, Kawasaki-shi, Kanagawa (JP)

(72) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 13/665,154

(22) Filed: Oct. 31, 2012

(65) Prior Publication Data

US 2013/0156031 A1 Jun. 20, 2013

(30) Foreign Application Priority Data

Dec. 19, 2011 (JP) ................. 2011-277580

(51) Int. Cl.
*H04W 4/00* (2009.01)
(52) U.S. Cl.
USPC .......................................... 370/390
(58) Field of Classification Search
None
See application file for complete search history.

(56) References Cited

U.S. PATENT DOCUMENTS

| 2009/0097485 A1 | 4/2009 | Okada et al. | |
|---|---|---|---|
| 2009/0213869 A1* | 8/2009 | Rajendran et al. | 370/420 |
| 2011/0090782 A1* | 4/2011 | Bianchi et al. | 370/201 |
| 2013/0028072 A1* | 1/2013 | Addanki | 370/218 |

FOREIGN PATENT DOCUMENTS

| JP | 2005-057390 | 3/2005 |
|---|---|---|
| JP | 2009-94832 | 4/2009 |

* cited by examiner

*Primary Examiner* — John Blanton
(74) *Attorney, Agent, or Firm* — Staas & Halsey LLP

(57) ABSTRACT

A communication apparatus includes a plurality of interface circuits, each interface circuit including a first processor, a plurality of ports, and a first memory configured to store, in each group composed of port of one or more, identification information for the group and identification information for the port belonging to the group, and a switch circuit including, a second processor, a second memory configured to store, in the each group, the identification information for the group and identification information for the interface circuit having port belonging to the group, and a bridge circuit configured to transmit data to the interface circuit.

13 Claims, 24 Drawing Sheets

FIG. 9

INDEX: VLAN ID + MAC ADDRESS: | V BIT | DEST. IF CARD NO. | DEST. PORT NO. | AGING BIT |

FIG. 10

INDEX: MGID: | IF CARD #0 | IF CARD #1 | ... | IF CARD #N |

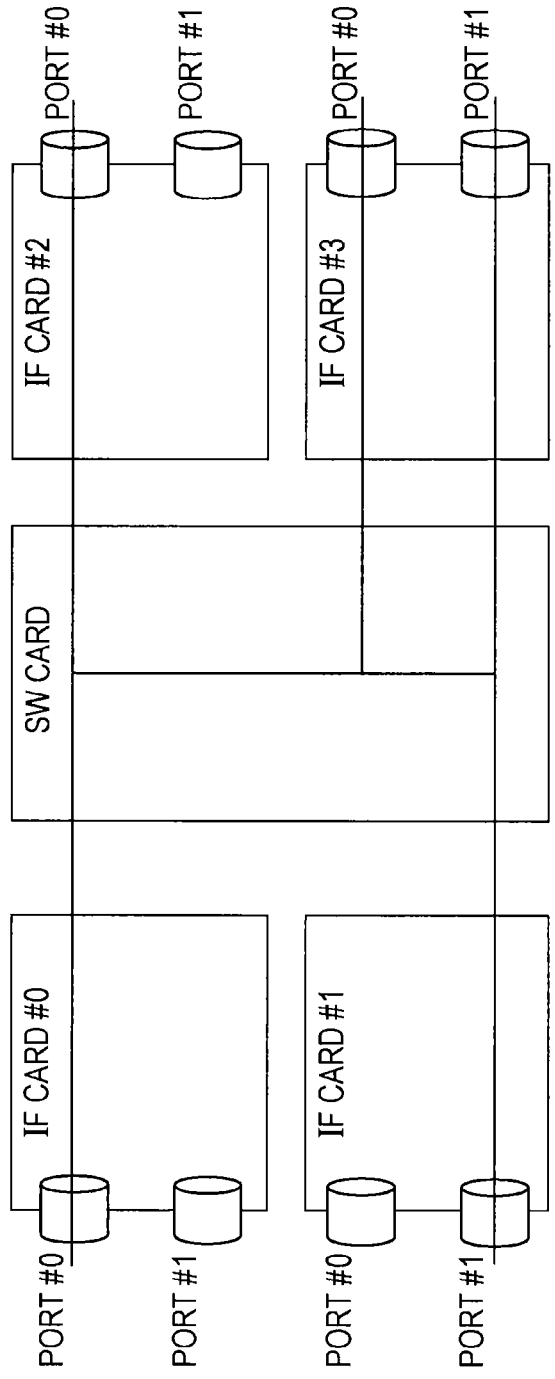

FIG. 13B

INDEX:

| PORT+VLAN ID: | V BIT | MGID |
|---|---|---|
| PORT #0+VID(=10): | 1 | 1 |

FIG. 13C

INDEX:

| MGID: | PORT #0 | PORT #1 |
|---|---|---|
| MGID=1: | 1 | 0 |

FIG. 13D

INDEX:

| PORT+VLAN ID: | V BIT | MGID |
|---|---|---|
| PORT #1+VID(=10): | 1 | 1 |

FIG. 13E

INDEX:

| MGID: | PORT #0 | PORT #1 |
|---|---|---|
| MGID=1: | 0 | 1 |

FIG. 13F

INDEX:

| PORT+VLAN ID: | V BIT | MGID |
|---|---|---|
| PORT #0+VID(=10): | 1 | 1 |

FIG. 13G

INDEX:

| MGID: | PORT #0 | PORT #1 |
|---|---|---|
| MGID=1: | 1 | 0 |

FIG. 13H

INDEX:

| PORT+VLAN ID: | V BIT | MGID |
|---|---|---|
| PORT #0+VID(=10): | 1 | 1 |
| PORT #1+VID(=10): | 1 | 1 |

FIG. 13I

INDEX:

| MGID: | PORT #0 | PORT #1 |
|---|---|---|
| MGID=1: | 1 | 1 |

FIG. 13J

| INDEX: | IF CARD #0 | IF CARD #1 | IF CARD #2 | IF CARD #3 |
|---|---|---|---|---|
| MGID: | | | | |
| MGID = 1: | 1 | 1 | 1 | 1 |

FIG. 18A

INDEX:
PORT+VLAN ID:

| | V BIT | MGID | COPY DETERRENCE BIT |
|---|---|---|---|
| PORT #0+VID(=10): | 1 | 1 | 1 |

FIG. 18B

INDEX:
MGID:

| | PORT #0 | PORT #1 |
|---|---|---|
| MGID=1: | 1 | 0 |

FIG. 18C

INDEX:
PORT+VLAN ID:

| | V BIT | MGID | COPY DETERRENCE BIT |
|---|---|---|---|
| PORT #1+VID(=10): | 1 | 1 | 1 |

FIG. 18D

INDEX:
MGID:

| | PORT #0 | PORT #1 |
|---|---|---|
| MGID=1: | 0 | 1 |

FIG. 18E

INDEX:

| PORT+VLAN ID: | V BIT | MGID | COPY DETERRENCE BIT |
|---|---|---|---|
| PORT #0+VID(=10): | 1 | 1 | 1 |

FIG. 18F

INDEX:

| MGID: | PORT #0 | PORT #1 |
|---|---|---|
| MGID=1: | 1 | 0 |

FIG. 18G

INDEX:

| PORT+VLAN ID: | V BIT | MGID | COPY DETERRENCE BIT |
|---|---|---|---|
| PORT #0+VID(=10): | 1 | 1 | 0 |
| PORT #1+VID(=10): | 1 | 1 | 0 |

FIG. 18H

INDEX:

| MGID: | PORT #0 | PORT #1 |
|---|---|---|
| MGID=1: | 1 | 1 |

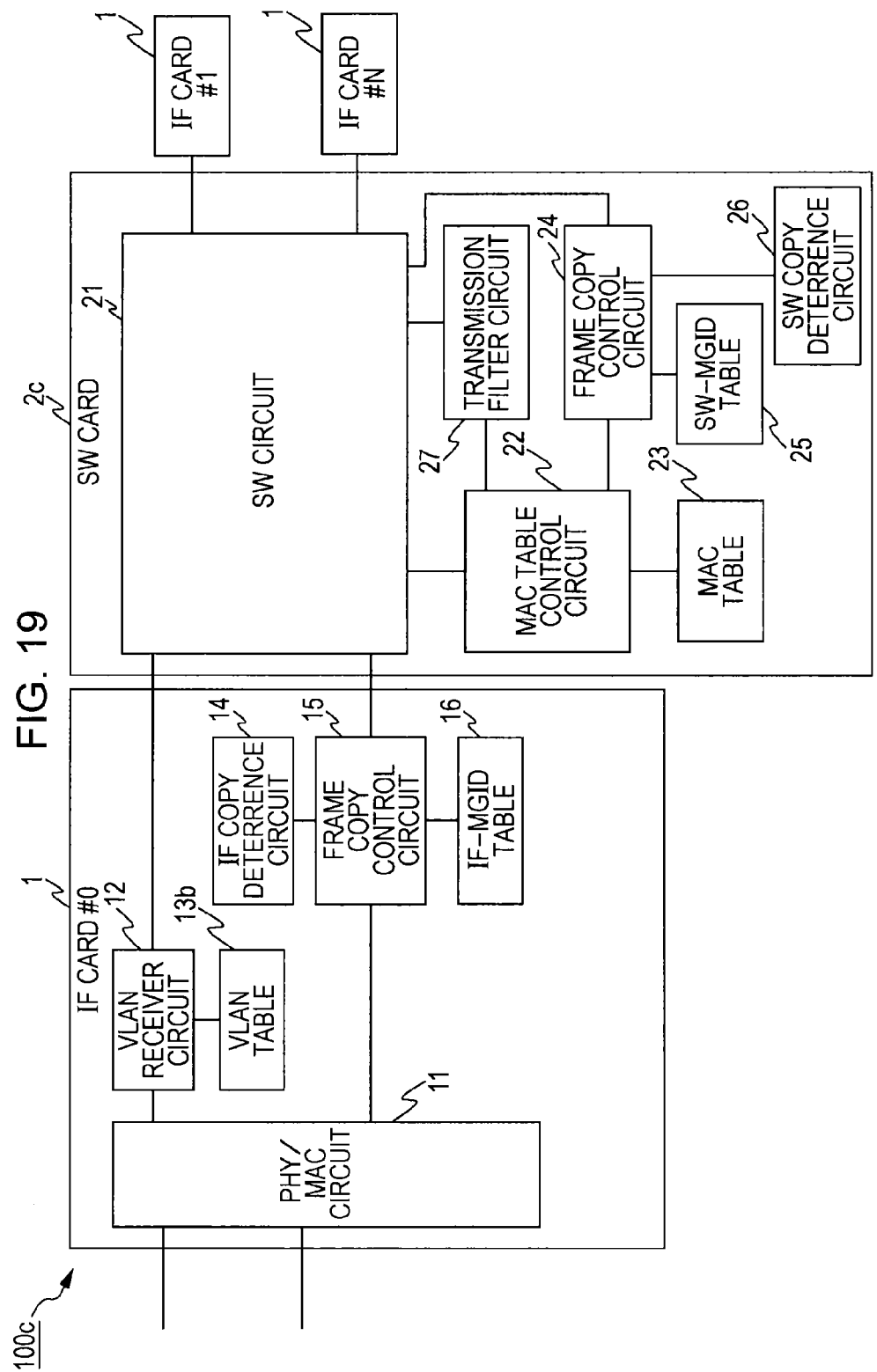

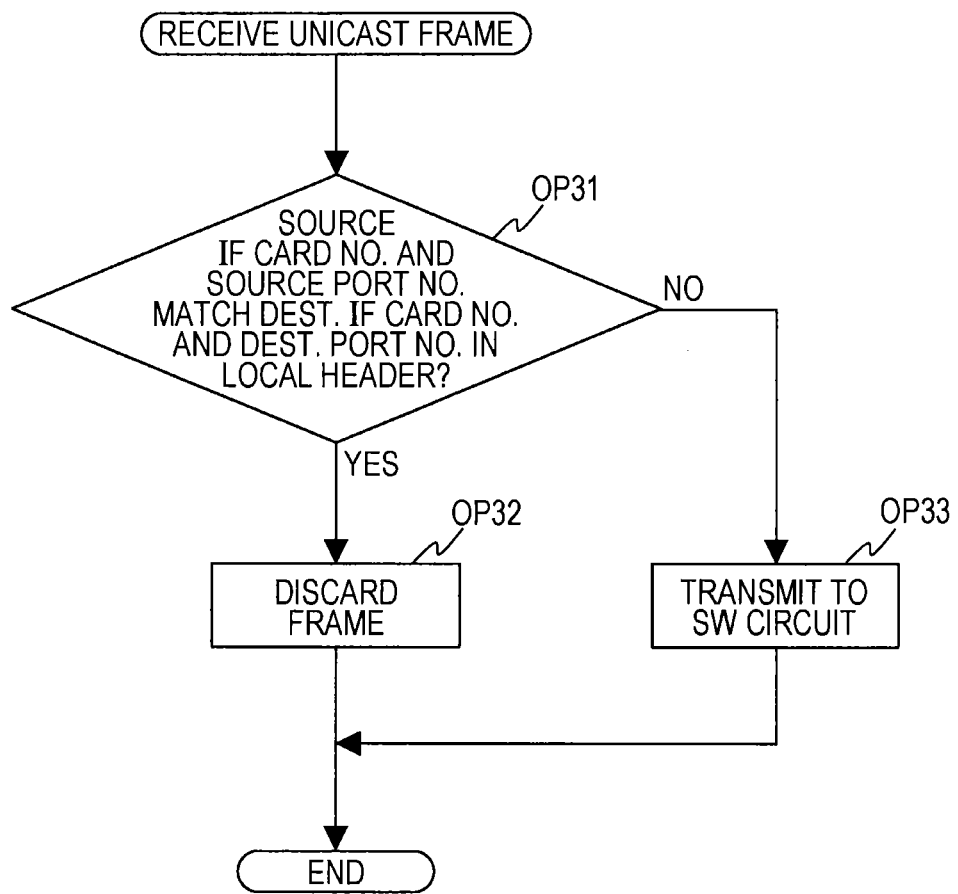

FIG. 22

INDEX:
CARD+PORT+VLAN ID:   | V BIT | MGID |

FIG. 23

INDEX:
MGID:   | IF CARD #0 | | | | ... | IF CARD #M | | |
        | PORT #0 | PORT #1 | ... | PORT #N | ... | PORT #0 | ... | PORT #N |

COMMUNICATION APPARATUS AND COMMUNICATION METHOD

CROSS-REFERENCE TO RELATED APPLICATION

This application is based upon and claims the benefit of priority of the prior Japanese Patent Application No. 2011-277580, filed on Dec. 19, 2011, the entire contents of which are incorporated herein by reference.

FIELD

The present disclosure relates to a communication apparatus and a communication method configured to transmit a received data block from a plurality of ports.

BACKGROUND

As the Internet and mobile networks have continued to proliferate in recent years, usage of packet-based networks utilizing Ethernet (registered trademark) technology and Internet Protocol (IP) technology is increasing on mobile carrier networks. Herein, a packet-based network designates a network in which data is transmitted and received in units of individual bundles, which are called packets. Note that in this specification, the terms packet and frame are treated as synonymous.

In a communication apparatus on a packet-based network such as an IP network or Ethernet (registered trademark) network, frames may be copied and transmitted from a plurality of ports. For example, there is the flooding, or in other words the transmission to multiple ports, of Ethernet (registered trademark) frames to a switch. As another example, there is the multicast transmission of IP frames for services such as video streaming services or IP television (IPTV) in a router.

Transmitting frames from multiple ports are conducted by grouping users, for example. In a switch, for example, users may be grouped under respective ports by grouping the ports according to a virtual local area network (VLAN). In a router, for example, users may be grouped using IP multicast groups.

FIG. 1 illustrates an exemplary network layout. A network 500 includes a plurality of communication apparatus 100 and a plurality of user terminals 200. The user terminals 200 are client devices with communication functions, such as personal computers, mobile phones, PDAs, and smartphones. The communication apparatus 100 receives frames transmitted from the user terminals 200, and forward frames on the basis of address and other information stored in the frames. For example, in the case where a user terminal 200 transmits an Ethernet (registered trademark) frame, a communication apparatus 100 forwards the frame on the basis of a MAC address stored in the received Ethernet (registered trademark) frame as address information. As another example, in the case where a user terminal 200 transmits an IP packet, a communication apparatus 100 forwards the packet on the basis of an IP address stored in the received IP packet as address information. Hereinafter, the case of the communication apparatus 100 forwarding Ethernet (registered trademark) frames will be described as an example.

FIG. 2 illustrates an exemplary configuration of a communication apparatus 100. The communication apparatus 100 includes a plurality of network interface (IF) cards 1, a switch (SW) card 2, and a control card 3. The IF cards 1 include ports, and circuits which provide functions for interfacing with external apparatus, functions for receiving frames, and functions for transmitting frames. The SW card 2 is connected to the IF cards 1 inside the communication apparatus 100 and exchanges data signals with the IF cards 1, and also includes circuits which provide switch functions for forwarding frames among the IF cards 1. The control card 3 is connected to the IF cards 1 and the SW card 2 inside the communication apparatus 100 and exchanges control signals with the IF cards 1 and the SW card 2, and also includes circuits which apply control over various settings in each card in the communication apparatus 100, alarms, and collection of statistical information. The control card 3 is also connected to an external terminal such as an external monitor.

The communication apparatus 100 may be an apparatus provided with bridging functions, for example. For example, examples of the communication apparatus 100 include Layer 2 switches, Layer 3 switches, and routers. In addition, the IF cards 1, the SW card 2, and the control card 3 may each be provided as modules or unit cards which can be freely inserted and removed from the communication apparatus 100, for example. Meanwhile, the IF cards 1, the SW card 2, and the control card 3 may also integrated with the motherboard or a mother card in the communication apparatus 100.

FIG. 3 illustrates Ethernet (registered trademark) frame formats. Hereinafter, "frame" will be used to indicate an Ethernet (registered trademark) frame, unless explicitly stated otherwise. FIG. 3 illustrates respective frame formats for a frame 91 without a virtual local area network (VLAN) tag, and a frame 92 with a single VLAN tag applied. It is possible for these frames to coexist on the same port of the communication apparatus 100.

The frame format of the frame 91 without a VLAN tag is as follows. MAC DA is a 6-byte field indicating the destination media access control (MAC) address. MAC SA is a 6-byte field indicating the source MAC address. E-TYPE is the Ethernet (registered trademark) type, and is a field storing the type of message stored in the subsequent protocol data unit (PDU). For example, a value of 0×0800 stored in the E-TYPE field indicates that the subsequent PDU is an IP version 4 (IPv4) packet. E-TYPE is a 2-byte field. Message types stored in the E-TYPE field are defined by the Internet Assigned Number Authority (IANA).

The PDU field stores a message for an upper layer, such as an IPv4 frame. The frame check sequence (FCS) field stores a CRC32 code used to detect errors in the frame. FCS is a 4-byte field.

The frame 92 with a single VLAN tag applied is a frame with one VLAN tag inserted between the MAC SA field and the E-TYPE field of the frame 91 without a VLAN tag. The VLAN tag includes a tag protocol ID (TPID) and a VLAN ID. The TPID is one of the Ethernet (registered trademark) types, and indicates that a VLAN ID is stored next. The TPID may be set to the value 0×8100, for example, which indicates IEEE 802.1Q. TPID is a 2-byte field. The VLAN ID stores a VLAN ID value used to identify the VLAN to which a user belongs. VLAN tags can be stacked consecutively.

The frame 91 without a VLAN tag may be used as a frame for a specific user or as a control frame transmitted and received among the communication apparatus 100 on a network port where frames from respective VLANs coexist, for example.

VLAN-tagged frames are used to assign different VLAN IDs to different users, such as assigning a VLAN ID=100 to a user A and a VLAN ID=200 to a user B, for example. By assigning different VLAN IDs to different users, it becomes possible to identify users on the network by their VLAN ID. In addition, users can be grouped by assigning the same VLAN ID to a plurality of users.

In the communication apparatus 100, frames received by the IF cards 1 are forwarded to the SW card 2. The SW card 2 stores information on a forwarding port which depends on the destination MAC address, and forwards the receive frames on the basis of this information.

In the case where forwarding port information corresponding to the destination MAC address included in a receive frame is not stored, the SW card 2 floods the VLAN domain corresponding to the receive frame with that receive frame. Flooding refers to the communication apparatus 100 copying and forwarding the receive frame on all ports belonging to the corresponding VLAN. The communication apparatus 100 stores a count of the number of copies of the flood frame as well as destination information which indicates information on the destination of the copied frame, and forwards frames on the basis of the destination information during flooding.

The destination information stores port numbers belonging to the corresponding VLAN ID in VLAN ID+receive port units. However, a client device existing under a receive port already receives the corresponding receive frame before the communication apparatus 100 receives that receive frame on that receive port. For this reason, if the SW card 2 also forwards a receive frame on a receive port and the receive frame is transmitted from the receive port, client devices under that receive port will receive the receive frame twice. In order to avoid receiving duplicate frames at a client device, port numbers belonging to the corresponding VLAN are stored in the destination information in VLAN ID+receive port units, excluding one's own receive port. For example, in the case where N ports in a communication apparatus 100 belong to a VLAN with VLAN ID=1, the communication apparatus stores N sets of destination information for the N ports, and each set of destination information includes N−1 other port numbers, with each port excluding itself.

For more information, see Japanese Laid-open Patent Application Publication No. 2005-57390 and Japanese Laid-open Patent Application Publication No. 2009-94832, for example.

In the case where the communication apparatus 100 supports many VLANs, or in the case where the communication apparatus 100 supports many ports, the amount of destination information managed within the apparatus increases, and there is a risk that the memory table footprint used to manage destination information may increase. Also, in the case where the communication apparatus 100 is not equipped with a large amount of memory, the supportable amount of destination information may be limited by the maximum available memory.

FIG. 4 illustrates an exemplary layout of a VLAN with VLAN ID=10 and exemplary destination information for respective ports belonging to a VLAN with VLAN ID=10 in a communication apparatus. In FIG. 4, the VLAN ID is labeled VID. Port #m on IF card #n is displayed as CnPm. Hereinafter, port #m on IF card #n may be referred to by CnPm in the specification.

In FIG. 4, the five ports C0P0, C1P1, C2P0, C3P0, and C3P1 belong to the VLAN with VLAN ID=10. The communication apparatus manages destination information with respect to these five ports for the VLAN with VLAN ID=10.

For example, in the case of receiving a frame with VLAN ID=10 on C0P0, the frame is transmitted to an SW card. In the case where forwarding port information corresponding to the destination MAC address included in the receive frame is not stored in the SW card, the SW card copies and transmits the receive frame to the ports included in the C0P0 destination information. As a result, copies of the receive frame addressed to C1P1, C2P0, C3P0, and C3P1 are transmitted from the SW card.

Also, in the case where C0P1 is added to the VLAN with VLAN ID=10, for example, the communication apparatus adds a sixth set of destination information taking C0P1 as a receive port for the VLAN with VLAN ID=10. Additionally, C0P1 is added to the five existing sets of destination information.

In the case where the communication apparatus supports many VLANs or many ports, the amount of destination information to modify increases as ports are added to or removed from VLANs, and the processing load imposed on the processor executing the software of the communication apparatus increases.

A communication apparatus may be able to support up to 4096 VLANs, for example. It is also possible to nest VLAN tags. For example, in the case where a frame is double-tagged with VLAN tags, it is possible to support approximately 17 million (4096×4096) VLANs. Furthermore, with regard to the number of ports, there exist communication apparatus into which 10 to 20 IF cards can be inserted, with each IF card supporting 64 Ethernet (registered trademark) ports, for example. Consequently, depending on the number of supported VLANs and ports, a communication apparatus may manage from hundreds of thousands to tens of millions of sets of destination information. In such cases, the memory footprint and the processing load on the processor executing the software become large. The foregoing describes an example of using the communication apparatus illustrated in FIG. 4 to manage ports belonging to a VLAN. However, the above is not limited to the management of ports belonging to VLANs, and similar events occur in the case of conducting communication while managing a plurality of grouped ports.

SUMMARY

According to an aspect of the invention, a communication apparatus includes a plurality of interface circuits, each interface circuit including a first processor, a plurality of ports, and a first memory configured to store, in each group composed of port of one or more, identification information for the group and identification information for the port belonging to the group, and a switch circuit including, a second processor, a second memory configured to store, in the each group, the identification information for the group and identification information for the interface circuit having port belonging to the group, and a bridge circuit configured to transmit data to the interface circuit, wherein the second processor is configured to execute a procedure including, acquiring, from the second memory, the identification information for the interface circuit associated with the identification information for the group indicated by data received from the interface circuit, and generating data by copying the data received from the interface circuit and by addressing to the interface circuit having identification information matching to the acquired identification information for interface circuit, and wherein the first processor is configured to execute a procedure including, adding, to the data received on the port, source information including the identification information for the interface circuit including the port on which the data has been received and the identification information for the port on which the data has been received, acquiring, from the first memory, the identification information for the port associated with the identification information for the group indicated by the data received from the switch circuit, generating data by copying the data received from the switch circuit and by addressing to the port having identification information matching to the acquired identification information for the port, determining whether or not there is a port that matches the source information added to the data received from the switch circuit, deterring the generation of the data by copying the data received from the switch circuit and by addressing to the port having identification information matching to the acquired identification information for the port, when there is the port that matches the source information, and transmitting the data generated by copying the data received from the switch circuit from the port to which the data has been addressed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of a MAC table;

FIG. 10 illustrates an example of an SW-MGID table;

FIG. 13A illustrates an operational example of a communication apparatus according to the first embodiment;

FIG. 13B illustrates an exemplary VLAN table for an IF card #0 in an operational example according to the first embodiment;

FIG. 13C illustrates an exemplary IF-MGID table for an IF card #0 in an operational example according to the first embodiment;

FIG. 13D illustrates an exemplary VLAN table for an IF card #1 in an operational example according to the first embodiment;

FIG. 13E illustrates an exemplary IF-MGID table for an IF card #1 in an operational example according to the first embodiment;

FIG. 13F illustrates an exemplary VLAN table for an IF card #2 in an operational example according to the first embodiment;

FIG. 13G illustrates an exemplary IF-MGID table for an IF card #2 in an operational example according to the first embodiment;

FIG. 13H illustrates an exemplary VLAN table for an IF card #3 in an operational example according to the first embodiment;

FIG. 13I illustrates an exemplary IF-MGID table for an IF card #3 in an operational example according to the first embodiment;

FIG. 13J illustrates an exemplary SW-MGID table for an SW card in an operational example according to the first embodiment;

FIG. 18A illustrates an exemplary VLAN table for an IF card #0 in an operational example according to the second embodiment;

FIG. 18B illustrates an exemplary IF-MGID table for an IF card #0 in an operational example according to the second embodiment;

FIG. 18C illustrates an exemplary VLAN table for an IF card #1 in an operational example according to the second embodiment;

FIG. 18D illustrates an exemplary IF-MGID table for an IF card #1 in an operational example according to the second embodiment;

FIG. 18E illustrates an exemplary VLAN table for an IF card #2 in an operational example according to the second embodiment;

FIG. 18F illustrates an exemplary IF-MGID table for an IF card #2 in an operational example according to the second embodiment;

FIG. 18G illustrates an exemplary VLAN table for an IF card #3 in an operational example according to the second embodiment;

FIG. 18H illustrates an exemplary IF-MGID table for an IF card #3 in an operational example according to the second embodiment;

FIG. 19 illustrates examples of circuits and tables respectively included in an IF card and an SW card in a communication apparatus according to the third embodiment;

FIG. 20 illustrates an exemplary flowchart of a process by a transmission filter circuit in an SW card;

FIG. 22 illustrates an exemplary VLAN table according to the fourth embodiment; and FIG. 23 illustrates an exemplary SW-MGID table according to the fourth embodiment.

DESCRIPTION OF EMBODIMENTS

Hereinafter, embodiments of the present disclosure will be described on the basis of the drawings. The configurations of the embodiments hereinafter are given by way of example, and the present disclosure is not limited thereto.

First Embodiment

In the first embodiment, a communication apparatus will be described in which the ports belonging to the same VLAN are grouped into a single multicast group in order to enable reduced usage of resources when transmitting copies of a frame from a plurality of ports. A multicast group is an example of a "group". Moreover, a VLAN is also an example of a "group" in the case of defining one VLAN as one multicast group. However, the term "group" is not limited to VLANs, and also includes IP multicast groups, for example.

Figure 1:
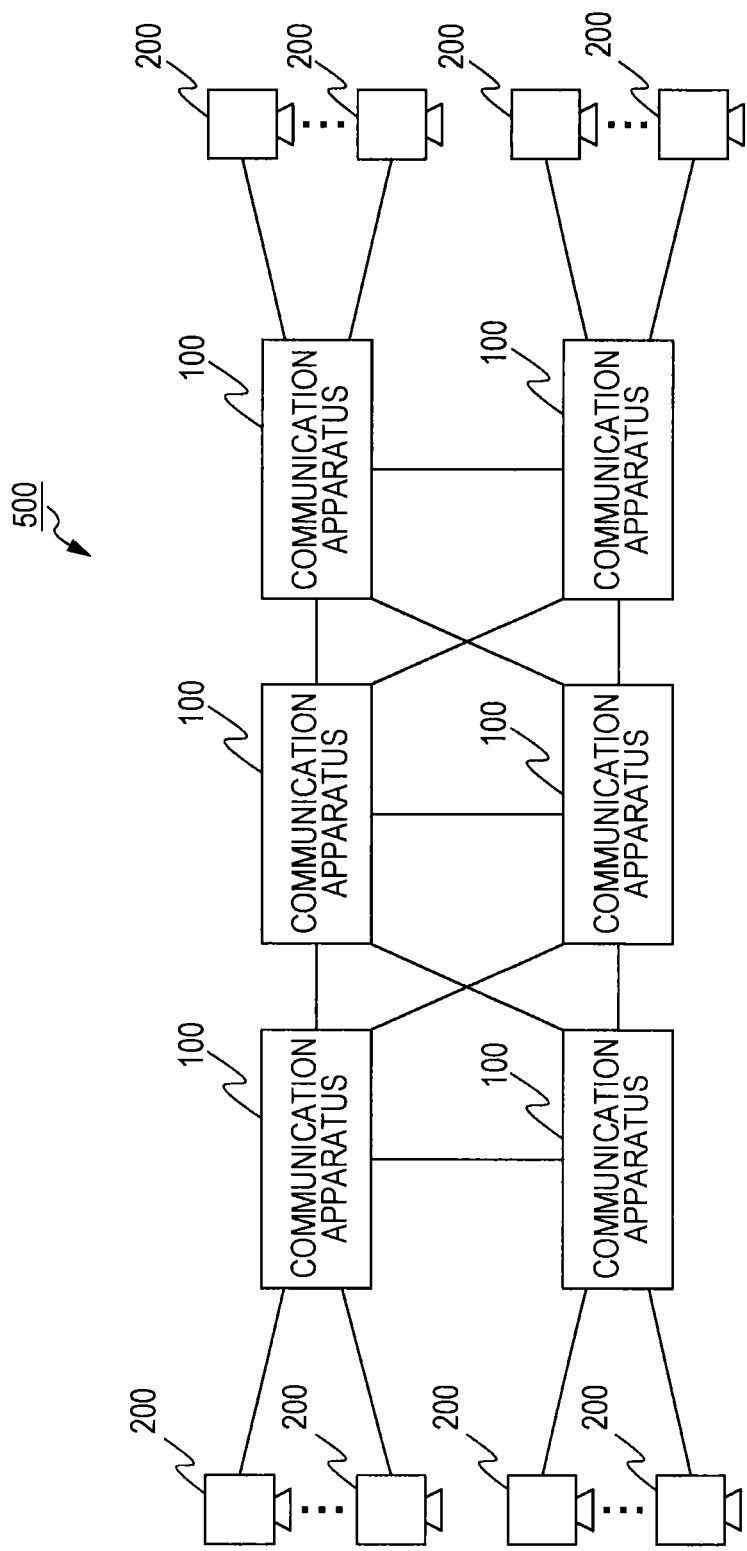
FIG. 1 illustrates an exemplary network layout.
Figure 2:
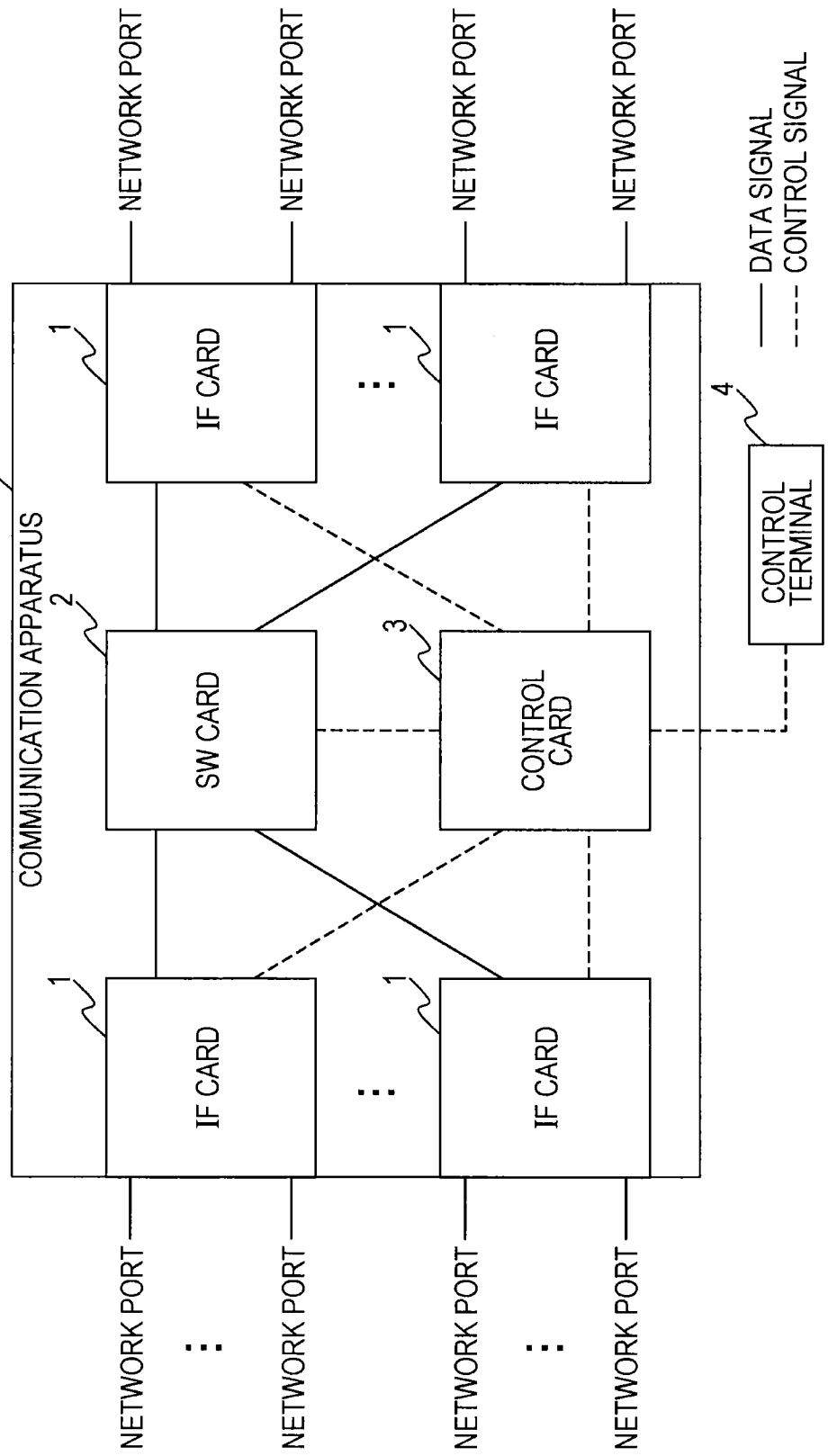
FIG. 2 illustrates an exemplary configuration of a communication apparatus.
Figure 3:
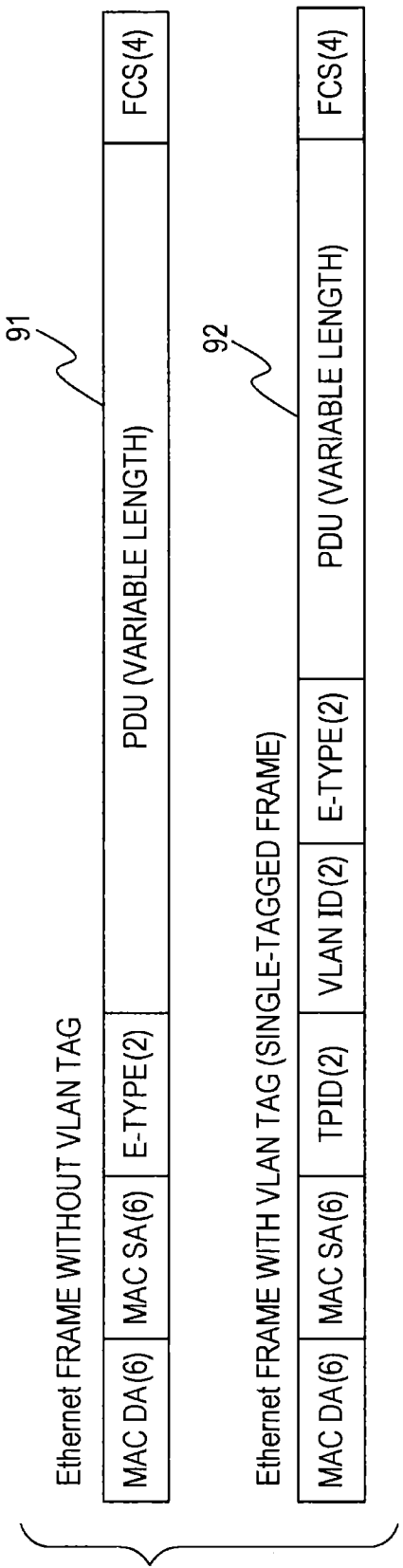
FIG. 3 illustrates Ethernet (registered trademark) frame formats.

The network topology in the first embodiment is similar to that of FIG. 1. Additionally, the configuration of the communication apparatus 100 is similar to that of FIG. 2. Also, Ethernet (registered trademark) frames are used on the network in the first embodiment.

<Communication Apparatus>

Figure 5:
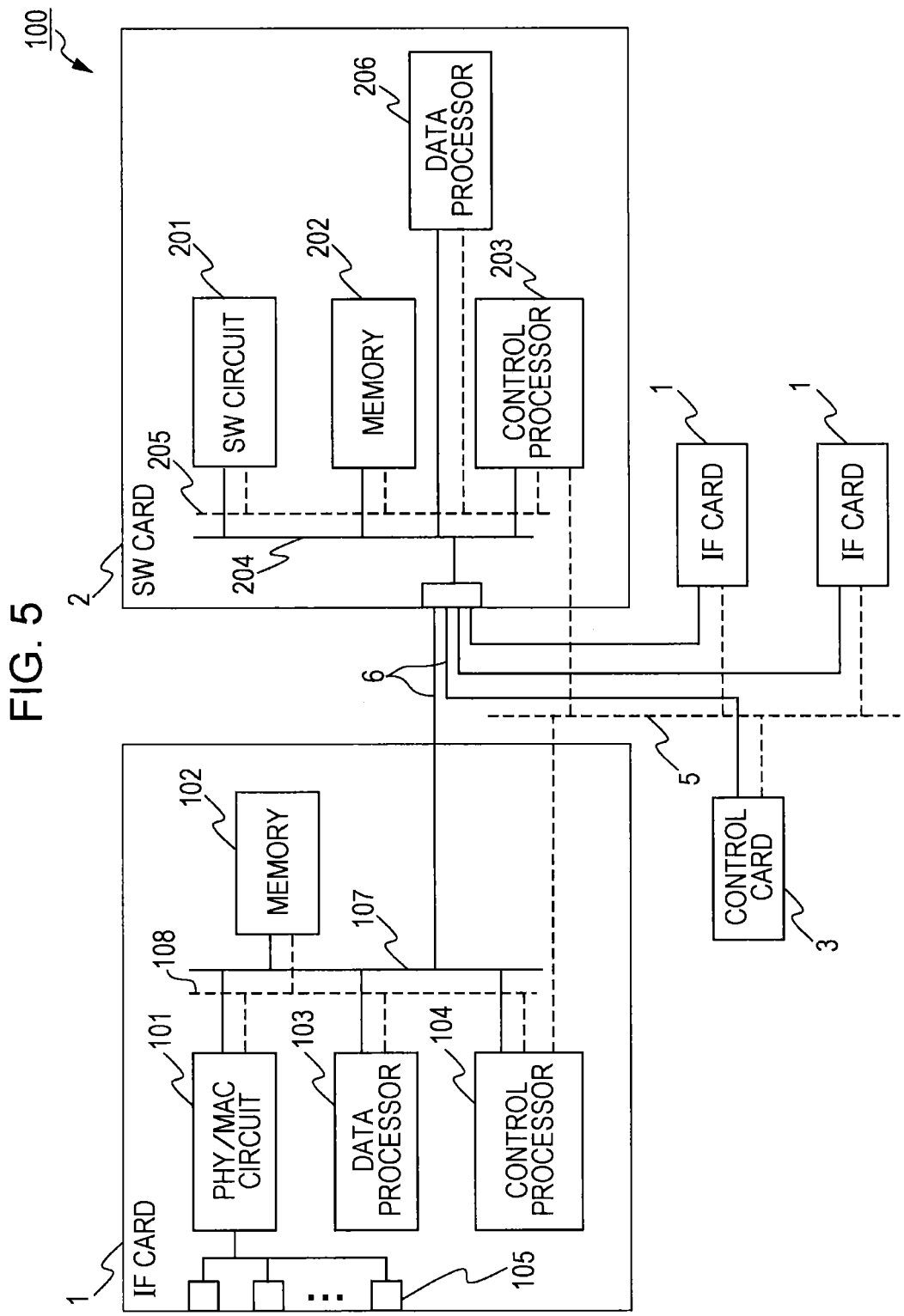
FIG. 5 illustrates an exemplary hardware configuration of an IF card and an SW card in a communication apparatus.

FIG. 5 illustrates an exemplary hardware configuration of an IF card 1 and an SW card 2 in a communication apparatus 100. A communication apparatus 100 according to the first embodiment may be provided with a plurality of IF cards 1, an SW card 2, and a control card 3, for example, similarly to the example illustrated in FIG. 2.

An IF card 1 in the communication apparatus 100 is provided with a physical layer/MAC layer (PHY/MAC) circuit 101, memory 102, a data processor 103, a control processor 104, and a plurality of ports 105. The plurality of ports 105 are connected to the PHY/MAC circuit 101. The PHY/MAC circuit 101, memory 102, data processor 103, and control processor 104 are respectively connected to a data bus 107 and a control but 108. In addition, the data bus 107 is connected to a data bus 6, which is connected to the SW card 2. In FIG. 5, data buses are indicated with solid lines, while control buses are indicated with broken lines. Note that in FIG. 5, an address bus has been omitted. The IF card 1 is an example of an "interface circuit". Besides the IF card 1, examples of an "interface circuit" also include corresponding chips and circuits on a motherboard or mother card in the case where IF cards 1 are integrated onto a motherboard or mother card.

The PHY/MAC circuit 101 conducts physical layer endpoint processing and MAC layer endpoint processing on a receive frame input from a port 105. In the MAC layer, the PHY/MAC circuit 101 performs an FCS check of the receive frame, and discards the frame if the FCS check returns an error result. A frame with no errors according to the results of the FCS check is output to the data bus 107.

The memory 102 may include volatile memory such as static random access memory (SRAM) or dynamic random access memory (DRAM), and non-volatile memory such as programmable read-only memory (PROM), for example. Various program and data are stored in the memory 102. The memory 102 is an example of "first memory".

The data processor 103 is a processor that processes communication-related data, such as a network processing unit (NPU) or data communication processor, for example. The data processor 103 processes frames encoded by the PHY/MAC circuit 101 and frames forwarded from the SW card 2. During such processing, the data processor 103 reads out information stored in the memory 102 as appropriate. The data processor 103 is an example of a "first processor".

The control processor 104 may be a central processing unit (CPU), for example. The control processor 104 manages the PHY/MAC circuit 101, the memory 102, and the data processor 103. The control processor 104 is connected to other control processors respectively provided in the SW card 2, other IF cards 1, and the control card 3 by a control bus 5. In addition, the control processor 104 controls the PHY/MAC circuit 101, the memory 102, and the data processor 103 according to instructions from the control processor included in the control card 3, which controls the communication apparatus 100 overall.

The PHY/MAC circuit 101, the memory 102, the data processor 103, and the control processor 104 included in an IF card 1 may each be an individual device or chip. Alternatively, an IF card 1 may also be one or a plurality of microcontrollers that include these circuits and devices. Furthermore, the hardware configuration of an IF card 1 is not limited to that illustrated in FIG. 5, and may also include components such as a field-programmable gate array (FPGA) and IC logic elements in addition to the configuration illustrated in FIG. 5, for example. The control processor 104 and the data processor 103 may also be a single processor.

The SW card 2 in the communication apparatus 100 is provided with a an SW circuit 201, memory 202, a control processor 203, and a data processor 206, which are respectively connected to a data bus 204 and a control bus 205. The SW card 2 is an example of a "switch circuit". Besides the SW card 2, examples of a "switch circuit" also include corresponding chips and circuits on a motherboard or mother card in the case where the SW card 2 is integrated onto a motherboard or mother card.

The SW circuit 201 forwards frames received from the IF cards 1. The memory 202 may include volatile memory such as SRAM or DRAM, and non-volatile memory such as PROM, for example. Various program and data are stored in the memory 202. The memory 202 is an example of "second memory".

The data processor 206 is a processor that processes communication-related data, such as an NPU or data communication processor, for example. The data processor 206 may perform processing such as searching a MAC table and computing forwarding destinations (destinations inside the communication apparatus 100) for frames received from the IF cards 1, for example. The data processor 206 is an example of a "second processor".

The control processor 203 may be a CPU, for example. The control processor 203 manages the SW circuit 201 and the memory 202. The control processor 203 is connected to other control processors respectively provided in the IF cards 1 and the control card 3 by the control bus 5. The control processor 203 controls the SW circuit 201 and the memory 202 according to control signals received via the control bus 5.

The SW circuit 201, the memory 202, and the control processor 203 included in the SW card 2 may each be an individual device or chip. Alternatively, the SW card 2 may also be included in one or a plurality of microcontrollers that include these circuits and devices. Furthermore, the hardware configuration of the SW card 2 is not limited to that illustrated in FIG. 5, and may also include components such as an FPGA and IC logic elements, for example. The control processor 203 and the data processor 206 may also be a single processor.

The control card 3 is provided with components such as a control processor and memory (not illustrated). The control processor in the control card 3 executes various programs stored in the memory, and controls the control processors in the IF cards 1 and the SW card 2 according to the program execution. In other words, operation is realized with the control processor of the control card 3 acting as a parent processor, and the control processors of the IF cards 1 and the SW card 2 acting as child processors. For example, the control processor of the control card 3 receives, from a management terminal connected to the communication apparatus 100, input for modifying VLAN-related information, such as creating a VLAN, adding a port to a VLAN, or removing a port from a VLAN. The control processor in the control card 3 issues instructions for modifying VLAN-related information to the control processor in the SW card 2 and in the IF cards 1 affected by the modification of VLAN-related information thus input. Upon receiving instructions from the control processor in the control card 3, the control processors in the IF cards 1 and the SW card 2 effect the modification of VLAN-related information in tables, etc. stored in the IF cards 1 and the SW card 2.

Figure 6:
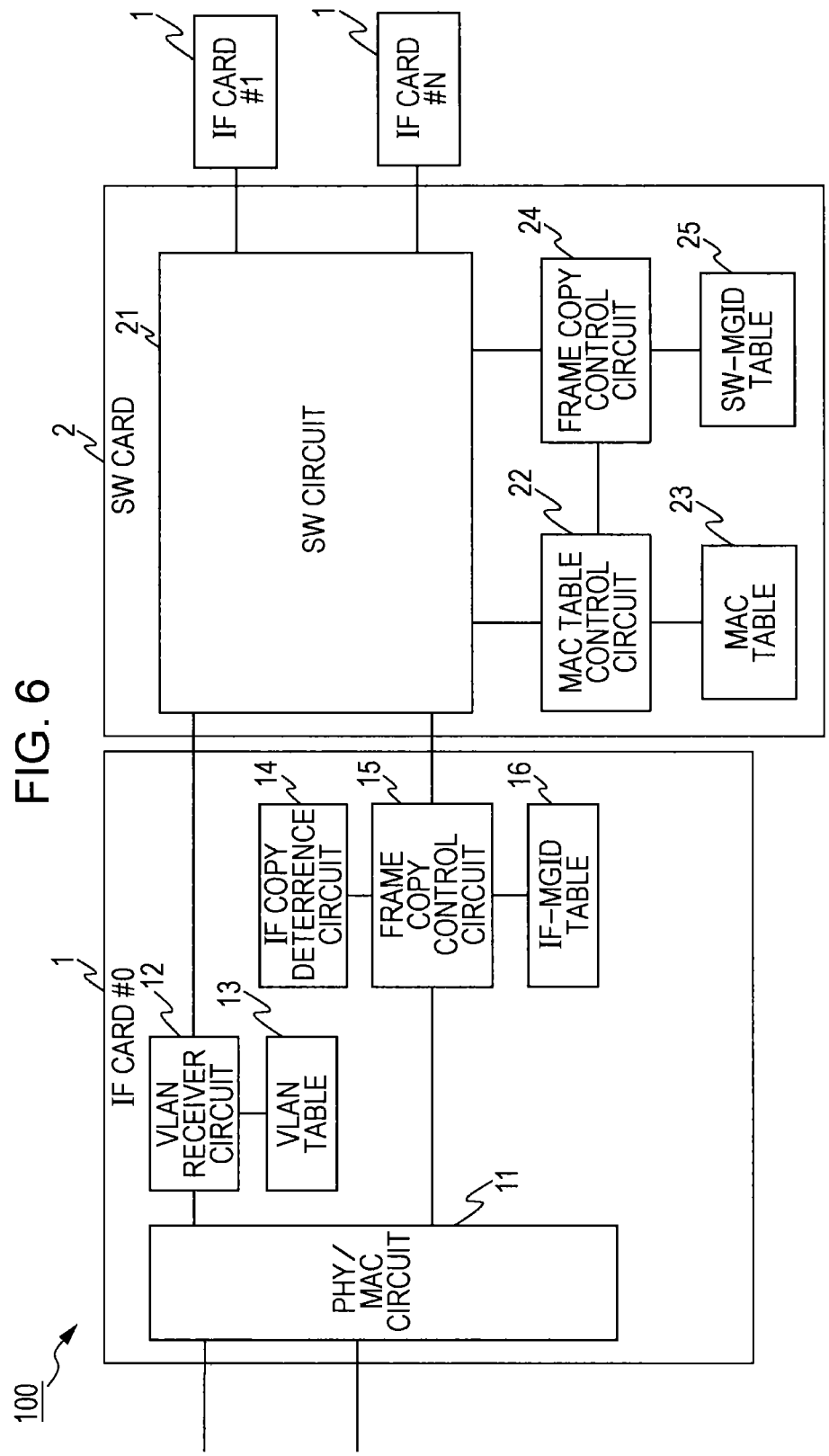
FIG. 6 illustrates examples of circuits and tables respectively included in an IF card and an SW card in a communication apparatus.

FIG. 6 illustrates examples of circuits and tables respectively included in an IF card 1 and an SW card 2 in a communication apparatus 100. The IF card 1 includes a PHY/MAC circuit 11, a VLAN receiver circuit 12, an IF copy deterrence circuit 14, a frame copy control circuit 15, a VLAN table 13, and an IF-MGID table 16.

The VLAN receiver circuit 12, the IF copy deterrence circuit 14, and the frame copy control circuit 15 in the IF card 1 are functions realized by the execution of various software stored in the memory 102 by the data processor 103 illustrated in FIG. 5. However, the configuration is not limited thereto, and the VLAN receiver circuit 12, the IF copy deterrence circuit 14, and the frame copy control circuit 15 in the IF card 1 may also be circuits realized with one or a plurality of IC logic elements or FPGAs, etc. not illustrated in FIG. 5, for example. For this reason, the VLAN receiver circuit 12, the IF copy deterrence circuit 14, and the frame copy control circuit 15 are illustrated as respective circuits in FIG. 6 and are described as such for the sake of convenience, even in the case where the above are functions realized by the execution of software by the data processor 103.

The VLAN table 13 and the IF-MGID table 16 are stored in the memory 102 in FIG. 5. The VLAN table 13 and the IF-MGID table 16 are managed by the control processor 104 in FIG. 5. The control processor 104 conducts management processes such as creating, updating, and deleting the VLAN table 13 and the IF-MGID table 16, on the basis of instructions from a control processor in the control card 3 that has received user input.

The SW card 2 includes an SW circuit 21, a MAC table control circuit 22, a frame copy control circuit 24, a MAC table 23, and an SW-MGID table 25. The SW circuit 21 is the SW circuit 201 illustrated in FIG. 5. The MAC table control circuit 22 and the frame copy control circuit 24 in the SW card 2 are functions realized by the execution of various software stored in the memory 202 by the data processor 206 illustrated in FIG. 5. However, the configuration is not limited thereto, and the MAC table control circuit 22 and frame copy control circuit 24 in the SW card 2 may also be circuits realized with one or a plurality of IC logic elements or FPGAs, for example. For this reason, the MAC table control circuit 22 and the frame copy control circuit 24 are illustrated as respective circuits in FIG. 6 and are described as such for the sake of convenience, even in the case where the above are functions realized by the execution of software by the data processor 206.

The MAC table 23 and the SW-MGID table 25 are stored in the memory 202 in FIG. 5. The MAC table 23 and the SW-MGID table 25 are managed by the control processor 203 in FIG. 5. The control processor 203 conducts management processes such as creating, updating, and deleting the MAC table 23 and the SW-MGID table 25, on the basis of instructions from a control processor in the control card 3 that has received user input.

Figure 7:
FIG. 7 is an example of a VLAN table.

First, each table will be explained. FIG. 7 is an example of the VLAN table 13. The VLAN table 13 indicates multicast groups corresponding to VLANs established on ports included in each IF card 1. The VLAN table 13 uses the combination of port number and VLAN ID as the index for each entry. Each entry in the VLAN table 13 includes valid (V) bit and multicast group identification (MGID) fields. The V bit is a flag indicating the validity of that entry. In the first embodiment, an entry is indicated as invalid in the case where 0 is stored in its V bit. In the case where the VLAN ID and receive port included in an externally received frame correspond to an invalid entry, that frame is discarded by the VLAN receiver circuit 12 in an IF card 1. Meanwhile, in the first embodiment, an entry is indicated as valid in the case where 1 is stored in its V bit. In the case where the VLAN ID and receive port included in an externally received frame correspond to a valid entry, the VLAN receiver circuit 12 in an IF card 1 stores the MGID for that entry in a local frame header of the receive frame. The local frame header will be discussed later.

The MGID is a multicast group identifier. Ports assigned with the same MGID are taken to be members of a multicast group. For example, in the case where there is no VLAN ID overlap among contracted users connecting to the ports in a communication apparatus 100, the same MGID may be assigned to the ports belonging to the same VLAN in a communication apparatus 100, shared among the IF cards. Meanwhile, in some cases there may be VLAN ID overlap among contracted users connected to the ports in a communication apparatus 100, with the contracted users being identified by port number. In such cases, MGIDs may be assigned according to the combination of port number and VLAN ID (i.e., the combination of contracted user and VLAN ID). As another example, in the case where a communication apparatus 100 handles frames which are double-tagged with VLAN tags, MGIDs may be assigned according to the combination of the two VLAN IDs contained in the double VLAN tags. MGIDs may use the same number as the VLAN ID or a different number. The MGID is an example of "identification information for group".

In the first embodiment, exemplary processing by a communication apparatus 100 will be described under the supposition that there is no VLAN ID overlap among contracted users connecting to the ports in the communication apparatus 100, and the same MGID is assigned to the ports belonging to the same VLAN in the communication apparatus 100. However, the first embodiment is not limited to this supposition.

An address area corresponding to all combinations of ports and VLAN IDs is reserved for the VLAN table 13 in the memory 102 of each IF card 1, for example. Each entry in the VLAN table 13 may be set by the control processor 104 according to input from a management terminal, for example.

Note that it is also possible to not use the receive port for the index of the VLAN table 13 in the case where there is no VLAN ID overlap among contracted users connecting to the ports in the communication apparatus 100, and the same MGID is assigned to the ports belonging to the same VLAN.

In addition, the VLAN ID contained in the VLAN tag of a receive frame may also be used as the MGID in the case where there is no VLAN ID overlap among contracted users connecting to the ports in the communication apparatus 100, and the same MGID is assigned to the ports belonging to the same VLAN. For this reason, in this case it is also possible for the IF cards 1 to not include the VLAN table 13. The VLAN ID in this case is included as an example of "identification information for group".

"Identification information for group" is not limited to the MGID or VLAN ID, and any information by which users can be identified, such as MAC addresses, are included as an example thereof. Also, in the case where the "group" is an IP multicast group, IP multicast group IDs and IP addresses, etc. are also included as an example.

Figure 8:
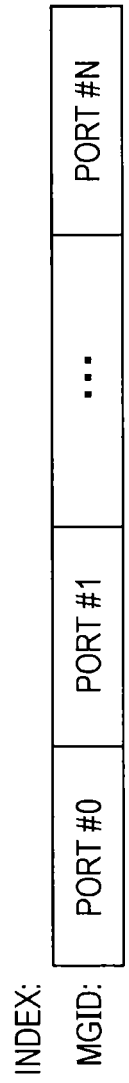
FIG. 8 illustrates an example of an IF-MGID table.

FIG. 8 illustrates an example of the IF-MGID table 16. The IF-MGID table 16 indicates the member ports of each multicast group in an IF card 1. The IF-MGID table 16 uses the MGID as the index for each entry. In each entry in the IF-MGID table 16, individual fields are associated with individual ports. A value of 1 or 0 is stored in each field corresponding to a particular port. In the first embodiment, a value of 0 being set in the field corresponding to a port indicates that the corresponding port is not participating in the multicast group with the MGID that acts as the index for that entry. Meanwhile, in the first embodiment, a value of 1 being set in the field corresponding to a port indicates that the corresponding port is participating in the multicast group with the MGID that acts as the index for that entry. Upon receiving a frame from the SW card 2, the frame copy control circuit 15 of an IF card 1 references the IF-MGID table 16 and acquires the ports participating in the multicast group with the MGID indicated by that frame. The frame copy control circuit 15 of the IF card 1 copies and transmits the frame through the acquired ports.

An MGID address area sufficient for the IF-MGID table 16 is reserved in the memory 102 of each IF card 1. Entries in the IF-MGID table 16 may be set by the control processor 104 according to input from a management terminal, for example.

FIG. 9 illustrates an example of the MAC table 23. The MAC table 23 is provided in the SW card 2. The MAC table 23 stores information on destination IF cards and destination ports for destination MAC addresses. The MAC table 23 uses the VLAN ID and MAC address as the index for each entry. Each entry in the MAC table 23 includes V bit, destination IF card number, destination port number, and aging bit fields.

The V bit is a bit indicating the validity of a corresponding entry in the MAC table 23. In the first embodiment, an entry in the MAC table 23 is indicated as invalid in the case where its V bit is 0. Meanwhile, in the first embodiment, an entry in the MAC table 23 is indicated as valid in the case where its V bit is 1. By default, the V bit is set to invalid (V bit=0).

An entry in the MAC table 23 is deleted (or invalidated) in the case where there is no access from the terminal having the MAC address in the index within a given time to live. The aging bit indicates an expired time to live. In the first embodiment, an entry is indicated as valid with remaining time to live in the case where its aging bit is 1. In the first embodiment, an entry is indicated as invalid with an expired time to live in the case where its aging bit is 0. By default, the aging bit is set to the value indicating an expired time to live (aging bit=0).

If the VLAN ID and destination MAC address contained in a receive frame are found in the MAC table 23 and the V bit for that entry is set to a value indicating validity (V bit=1), this indicates that the receive frame is to be sent by unicast transmission. In this case, the SW card 2 stores the destination IF card number and destination port number of that entry in the local header of the receive frame, and transmit the receive frame to the destination IF card 1. If the VLAN ID and destination MAC address contained in a receive frame are found in the MAC table 23 and the V bit for that entry is set to a value indicating invalidity (V bit=0), or if a corresponding entry does not exist, this indicates that unicast transmission is invalid. In this case, the receive frame is used to flood the corresponding VLAN.

If the VLAN ID and source MAC address contained in a receive frame are found in the MAC table 23 and the V bit for that entry is set to a value indicating validity (V bit=1), this indicates that the source MAC address is already registered. In this case, the MAC table control circuit 22 in the SW card 2 overwrites the aging bit for that entry with 1 to set a time to live, for example. If the VLAN ID and source MAC address contained in a receive frame are found in the MAC table 23 and the V bit for that entry is set to a value indicating invalidity (V bit=0), or if a corresponding entry does not exist, this indicates that the source MAC address has not been registered. In this case, the MAC table control circuit 22 in the SW card 2 registers an entry in the MAC table 23. The registered entry uses the VLAN ID and source MAC address contained in the receive frame as an index. The source IF card number and source port number in the local header of the receive frame are registered in the destination IF card number and destination port number fields of the entry registered in the MAC table 23. Also, the aging bit of the entry registered in the MAC table 23 is set to a value indicating that the entry is alive (aging bit=1).

Also, all entries are periodically retrieved from the MAC table 23 by the MAC table control circuit 22 in the SW card 2 according to a given cycle. At this point, if an entry has an aging bit set to 1, the aging bit is overwritten to 0. Meanwhile, if an entry has an aging bit set to 0, the V bit for that entry is overwritten to 0, thus invalidating that entry.

The MAC table 23 may be created in memory such as SRAM or DRAM. In this case, an address area for a sufficient number of VLAN ID and MAC address combinations is reserved for the MAC table 23. In addition, the indices for the MAC table 23 may be a given computational result from a VLAN ID and a MAC address. The given computational result may be a hash value obtained by a hash algorithm, for example. The MAC table 23 may also be created using associative memory such as content-addressable memory (CAM). In this case, the associative memory is searched for a VLAN ID, source MAC address, or destination address, and entries are retrieved from associative memory addresses corresponding to the search results. In the case of using associative memory to create the MAC table 23, an entry is deleted from the associative memory upon becoming invalid. Hereinafter, in the first embodiment, the MAC table 23 will be described as being created in SRAM or DRAM.

FIG. 10 illustrates an example of the SW-MGID table 25. The SW-MGID table 25 stores information on IF cards 1 having ports belonging to respective multicast groups. The SW-MGID table 25 is provided in the SW card 2, and is used in order to compute which IF cards 1 are to receive copies of a receive frame in the case of receive frame flooding.

The SW-MGID table 25 uses the MGID as the index for each entry. In each entry in the SW-MGID table 25, individual fields are associated with individual IF cards 1. The field corresponding to a particular IF card 1 stores a value which indicates whether or not any ports included in that IF card 1 are participating in the multicast group with the MGID for that entry. In the first embodiment, a value of 0 being set in a field corresponding to a particular IF card 1 indicates that none of the ports included in that IF card 1 are participating in the corresponding multicast group. Meanwhile, in the first embodiment, a value of 1 being set in a field corresponding to a particular IF card 1 indicates that at least one of the ports included in that IF card 1 is participating in the corresponding multicast group. In other words, when flooding with a receive frame, copies of the receive frame are transmitted to IF cards 1 whose corresponding fields are set to 1 in the entry of the SW-MGID table 25 that corresponds to the MGID contained in the local frame header of the receive frame.

An MGID address area sufficient for the SW-MGID table 25 is reserved in the memory 202 of the SW card 2. Entries in the SW-MGID table 25 may be set by the control processor 203 in FIG. 5 according to input from a user, for example.

Figure 11:
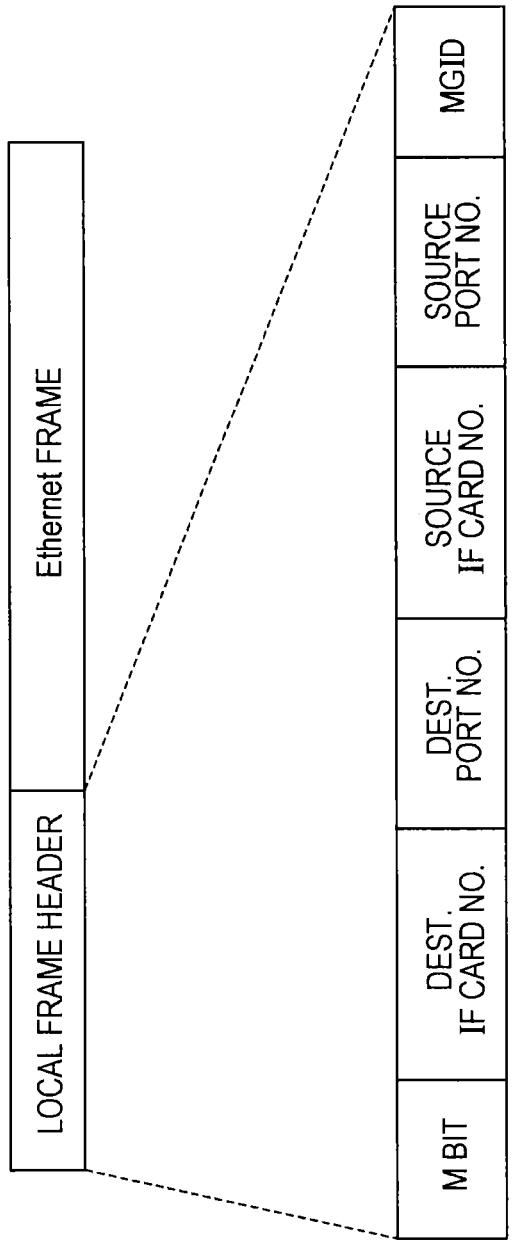
FIG. 11 illustrates an exemplary local frame header format.

FIG. 11 illustrates an exemplary local frame header format. The local frame header is a header used within a communication apparatus 100, and includes information on which IF cards 1 and ports in a communication apparatus 100 are to receive a frame. The local frame header includes M bit, destination IF card number, destination port number, source IF card number, source port number, and MGID fields. Hereinafter, the local frame header may also be simply referred to as the local header.

The M bit indicates whether or not a multicast group is to be flooded with that frame. In the first embodiment, an M bit of 0 indicates that the multicast group is not to be flooded with that frame, or in other words indicates that the receive frame is a unicast frame with one destination port. Meanwhile, in the first embodiment, an M bit of 1 indicates that the multicast group is to be flooded with that frame. By default, the M bit is set to a value indicating that a multicast group is not to be flooded with the frame (M bit=0). Herein, the flooding of a multicast group with a frame will be hereinafter referred to as multicast transmission. Note that such multicast transmission also includes broadcast transmission in which a frame is transmitted to all IF cards 1 from the SW card 2.

The destination IF card number and destination port number fields store the number and port number of the IF card 1 which is to receive the receive frame. Destination IF card numbers and destination port numbers are stored in the SW card 2 (details will be discussed later).

The source IF card number and source port number fields store the number and port number of the IF card 1 that received the receive frame from an external source. The MGID field stores the MGID corresponding to the VLAN of the receive frame which was acquired by an IF card 1. The source IF card number, source port number, and MGID values are written in the IF card 1. Note that the local header format is not limited to the above. For example, it is also possible to not include an MGID field in the local header in the case where there is no VLAN ID overlap among contracted users connecting to the ports in a communication apparatus 100 and the VLAN ID contained in the VLAN tag of a receive frame is used as the MGID.

Returning to FIG. 6, the respective circuits included in the communication apparatus 100 will now be described. The PHY/MAC circuit 11 in each IF card 1 is the PHY/MAC circuit 101 illustrated in FIG. 5. The PHY/MAC circuit 11 adds and removes local headers with respect to frames. Specifically, the PHY/MAC circuit 11 conducts PHY layer and MAC layer endpoint processing on a signal input from a port, adds a local header to the frame, and transmits the result to the VLAN receiver circuit 12. However, all fields are empty in the local header of a frame transmitted from the PHY/MAC circuit 11 to the VLAN receiver circuit 12. Also, in the case of receiving a frame from the frame copy control circuit 15, the PHY/MAC circuit 11 removes the local header from the frame, conducts PHY layer and MAC layer endpoint processing, and transmits the result to the port indicating by the destination port number contained in the local header. The PHY/MAC circuit 11 is an example of a "transmitter circuit".

The VLAN receiver circuit 12 in each IF card 1 is a circuit that conducts frame receiving processing. In the case of receiving a frame from the PHY/MAC circuit 11, the VLAN receiver circuit 12 references the VLAN table 13 and acquires the entry corresponding to the VLAN ID and receive port indicated by the VLAN tag in the receive frame. In the case where the VLAN receiver circuit 12 is an IC chip element or a circuit in an FPGA, entry retrieval from the VLAN table 13 is conducted by the data processor 103.

A V bit of 0 indicates that the corresponding entry is invalid, and in this case the VLAN receiver circuit 12 discards the receive frame. A V bit of 1 indicates that the corresponding entry is valid, and in this case the VLAN receiver circuit 12 writes information into the local header of the receive frame, and transmits the result to the SW card 2. Specifically, the VLAN receiver circuit 12 sets the M bit in the local header to its default value of 0 (the value indicating that the multicast group is not to be flooded with that frame). The VLAN receiver circuit 12 writes the number of the IF card 1 itself that received the receive frame and the port number where the receive frame was received into the source IF card number and source port number fields of the local header. The VLAN receiver circuit 12 writes the MGID acquired from the corresponding entry in the VLAN table 13 into the MGID field of the local header. The destination IF card number and destination port number fields of the local header are left blank. The VLAN receiver circuit 12 is an example of an "addition circuit".

Meanwhile, in the case where a client device is connected on a port, frames received from the client device do not include a VLAN tag. In the case where a client device is connected to a port in the communication apparatus 100, the corresponding IF card 1 stores information on the port belonging to a VLAN in separate memory 102, and from this information acquires a VLAN ID from the receive port of the frame. After that, the IF card 1 acquires an MGID from the VLAN table 13, using the VLAN ID and the receive port as an index.

Frames transmitted from the VLAN receiver circuit 12 in each IF card 1 are received by the MAC table control circuit 22 in the SW card 2. The MAC table control circuit 22 is a circuit that controls the MAC table 23.

The MAC table control circuit 22 acquires, from the MAC table 23, an entry indexed by the destination MAC address and VLAN ID contained in a receive frame. However, in the case where the MAC table 23 is stored in memory such as SRAM or DRAM, the MAC table control circuit 22 may also apply a hash algorithm to the destination MAC address and VLAN ID of the receive frame, and from the MAC table 23 read out an entry indexed by the hash result. In the case where associative memory such as CAM is used to store the MAC table 23, the VLAN receiver circuit 12 may also access the associative memory using the destination MAC address and VLAN ID in the receive frame as a search key. In the case where the MAC table control circuit 22 is an IC chip element or a circuit in an FPGA, entry retrieval from the MAC table 23 is conducted by the data processor 206.

The entry corresponding to the MAC address is valid if its V bit is 1, which indicates that the receive frame's destination within the communication apparatus 100 is registered in the MAC table 23, and that the receive frame is to be forwarded by unicast transmission. In this case, the MAC table control circuit 22 writes the destination IF card number and destination port number from the corresponding entry in the MAC table 23 into the destination IF card number and destination port number fields of the receive frame's local header. The M bit in the local header is left at the default value of 0 (the value indicating that the multicast group is not to be flooded with that frame). The MAC table control circuit 22 transmits the receive frame with the updated local header to the SW circuit 21. The SW circuit 21 transmits the receive frame to the IF card 1 indicated by the destination IF card number in the local header of the receive frame.

The entry corresponding to the MAC address is invalid if its V bit is 0, which indicates that the receive frame's destination within the communication apparatus 100 is not registered in the MAC table 23, and that the receive frame is to be multicast over the corresponding VLAN. In this case, MAC table control circuit 22 sets the M bit in the local header of the receive frame to 1 (the value indicating that the multicast group is to be flooded with that frame), and transmits the result to the frame copy control circuit 24.

Also, in the case of receiving a frame from an IF card 1, the MAC table control circuit 22 performs the above processing and additionally acquires the MAC table 23 entry indexed by the VLAN ID and source MAC address of the receive frame.

A V bit of 1 in the acquired entry indicates that an entry indexed by the VLAN ID and source MAC address of the receive frame is registered in the MAC table 23 and is valid. In this case, the MAC table control circuit 22 overwrites the aging bit for that entry with 1 (the value indicating that the entry is alive) to reset that entry's time to live.

A V bit of 0 in the acquired entry indicates that the entry indexed by the VLAN ID and source MAC address of the receive frame is invalid and that the corresponding destination information is not registered in the MAC table 23. In this case, the MAC table control circuit 22 respectively stores the source IF card number and source port number in the local header of the receive frame in the destination IF card number and destination port number fields of the corresponding entry in the MAC table 23. The MAC table control circuit 22 also sets the corresponding entry's V bit to 1 (the value indicating that the entry is valid). Additionally, the MAC table control circuit 22 sets the corresponding entry's aging bit to 1.

In addition to the above processing, the MAC table control circuit 22 also periodically retrieves all entries in the MAC table 23 according to a given cycle, and if an entry has an aging bit of 1, that entry's aging bit is overwritten to 0. The given cycle may be five minutes, for example. Meanwhile, if an entry has an aging bit of 0, that entry's time to live has expired, and thus the MAC table control circuit 22 invalidates that entry by setting its V bit to 0.

The frame copy control circuit 24 is a circuit that controls the copying of frames in the case of forwarding by multicast. Upon receiving a receive frame, the frame copy control circuit 24 acquires the SW-MGID table 25 entry indexed by the MGID contained in the local header of that frame. The receive frame is copied a number of times equal to the number of IF cards 1 whose corresponding field has a value of 1 (the value indicating that the corresponding IF card 1 has ports which are participating in the multicast group with that MGID) in the corresponding entry. The frame copy control circuit 24 respectively stores the numbers of the IF cards 1 having ports which are port of the multicast group with the corresponding MGID in the destination IF card number fields of the local headers of the copied frames. The copied frames are transmitted to the SW circuit 21. The SW circuit 21 transmits each frame to the IF card 1 indicated by the destination IF card number in the local header of that frame. The frame copy control circuit 24 is an example of a "second copy circuit". The SW circuit 21 is an example of a "bridge circuit".

Frames transmitted by the SW circuit 21 are received by the frame copy control circuit 15 in each IF card 1. The frame copy control circuit 15 is a circuit that controls multicast forwarding conducted in an IF card 1 for a frame received from the SW circuit 21. The frame copy control circuit 15 first acquires the result of a receive frame copy deterrence determination executed by the IF copy deterrence circuit 14. The IF copy deterrence circuit 14 makes a receive frame copy deterrence determination in order to void external retransmission of a copied receive frame from the receive port where the receive frame was externally received. The frame copy control circuit 15 copies the receive frame on the basis of the result of the receive frame copy deterrence determination. The frame copy control circuit 15 is an example of a "first copy circuit". The IF copy deterrence circuit 14 is an example of a "first deterrence circuit".

Figure 12:
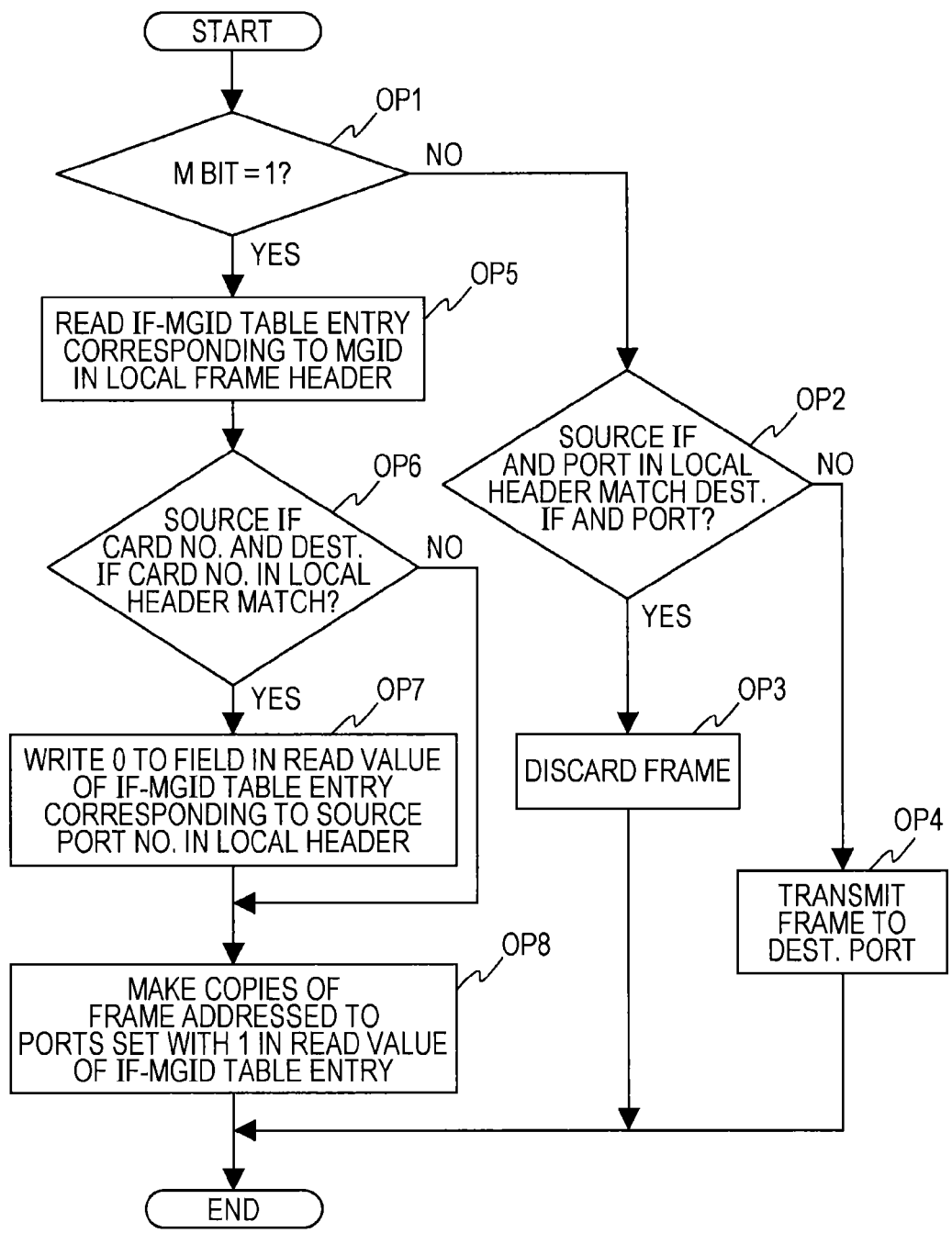
FIG. 12 illustrates an exemplary flowchart of a process conducted by a frame copy control circuit and an IF copy deterrence circuit in an IF card.

FIG. 12 illustrates an exemplary flowchart of a process conducted by the frame copy control circuit 15 and the IF copy deterrence circuit 14 in an IF card. The flowchart illustrated in FIG. 12 is initiated when the frame copy control circuit 15 receives a frame from the SW card 2.

In OP1, the frame copy control circuit 15 determines whether or not the M bit contained in the local header of the receive frame has a value of 1. An M bit of 1 in the local header of the receive frame (OP1: Yes) indicates that the multicast group with the corresponding MGID is to be flooded with the receive frame, and the process proceeds to OP5. An M bit of 0 in the local header of the receive frame (OP1: No) indicates that the multicast group with the corresponding MGID is not to be flooded with the receive frame, and the process proceeds to OP2.

In OP2, the IF copy deterrence circuit 14 determines whether or not the source IF card number and source port number in the local header of the receive frame match the destination IF card number and destination port number in the local header of the receive frame. In OP2, the receive frame is a unicast frame, and thus respective values for the destination IF card number and destination port number have been stored in the local header by the SW card 2. In the case where the source IF card number and source port number in the local header of the receive frame match the destination IF card number and destination port number in the local header of the receive frame (OP2: Yes), the process proceeds to OP3. In the case where the source IF card number and source port number in the local header of the receive frame do not match the destination IF card number and destination port number in the local header of the receive frame (OP2: No), the process proceeds to OP4. The comparison processing illustrated by example in OP2 may be realized with a register that stores the source IF card number and source port number from the local header, a register that stores the destination IF card number and destination port number, and a subtraction circuit that subtracts the values in these registers, for example.

In OP3, the frame copy control circuit 15 receives a determination result from the IF copy deterrence circuit 14 indicating that the source IF card number and source port number match the destination IF card number and destination port number in the local header of the unicast frame. In this case, the frame copy control circuit 15 discards the receive frame. Doing so avoids the retransmission of a receive frame from the receive port that received that receive frame. After that, the flowchart illustrated in FIG. 12 ends.

In OP4, the frame copy control circuit 15 receives a determination result from the IF copy deterrence circuit 14 indicating that the source IF card number and source port number in the local header of the unicast frame do not match the destination IF card number and destination port number. In this case, the frame copy control circuit 15 transmits the frame to the port indicating by the destination port number in the local header. After that, the flowchart illustrated in FIG. 12 ends.

In OP5, the frame copy control circuit 15 acquires the IF-MGID table 16 entry corresponding to the MGID in the local header of the receive frame, and stores the acquired entry in memory internal to the frame copy control circuit 15 (or in the memory 102). This IF-MGID table 16 entry stored in memory will be referred to as the read value of the IF-MGID table 16 entry, or simply the read value. The process then proceeds to OP6.

In OP6, the IF copy deterrence circuit 14 determines whether or not the source IF card number matches the destination IF card number in the local header of the multicast frame. In OP6, since the receive frame is a multicast frame, a value is stored in the destination IF card number field of the local header, but the destination port number field is blank. In the case where the source IF card number matches the destination IF card number in the local header of the frame (OP6: Yes), the process proceeds to OP7. If the source IF card number does not match the destination IF card number in the local header of the frame (OP6: No), this indicates that the IF card 1 does not have a receive port for the receive frame, and the process proceeds to OP8.

In OP7, it has been indicated that the IF card 1 has a receive port for the receive frame, and thus the IF copy deterrence circuit 14 writes 0 in the field that corresponds to the source port number of the local header in the read value of the IF-MGID table 16 entry. In other words, the read value of the IF-MGID table 16 entry is overwritten so as to indicate that the corresponding port (the port indicated by the source port number in the local header) is not participating in the multicast group with the corresponding MGID. The updated read value of the IF-MGID table 16 entry becomes the copy deterrence determination result of the IF copy deterrence circuit 14. The process then proceeds to OP8.

In OP8, the frame copy control circuit 15 transmits copies of the receive frame to the ports whose corresponding field is set to 1 in the read value of the IF-MGID table 16 entry. At this point, the frame copy control circuit 15 updates the destination port number in the local header of each copy of the frame with the respective numbers of the corresponding ports. Upon transmitting copies of the frame, the frame copy control circuit 15 deletes the read value of the IF-MGID table 16 entry being stored in the memory of the frame copy control circuit 15. The frames transmitted from the frame copy control circuit 15 have their local headers removed in the PHY/MAC circuit 11, and are transmitted externally from their respectively corresponding ports. After that, the flowchart illustrated in FIG. 12 ends.

<Operational Example>

FIG. 13A illustrates an operational example of a communication apparatus according to the first embodiment. The IF cards and SW card illustrated in FIG. 13A are configured similarly to the IF card 1 and SW card 2 discussed earlier. In FIG. 13A, destination information is displayed for ports belonging to a VLAN with VLAN ID=10. In FIG. 13A, C0P0, C1P1, C2P0, C3P0, and C3P1 belong to the VLAN with VLAN ID=10, and are participating in a multicast group with MGID=1.

FIG. 13B illustrates an exemplary VLAN table for an IF card #0 in an operational example according to the first embodiment. FIG. 13C illustrates an exemplary IF-MGID table for an IF card #1 in an operational example according to the first embodiment. FIG. 13D illustrates an exemplary VLAN table for an IF card #1 in an operational example according to the first embodiment. FIG. 13E illustrates an exemplary IF-MGID table for an IF card #1 in an operational example according to the first embodiment. FIG. 13F illustrates an exemplary VLAN table for an IF card #2 in an operational example according to the first embodiment. FIG. 13G illustrates an exemplary IF-MGID table for an IF card #2 in an operational example according to the first embodiment. FIG. 13H illustrates an exemplary VLAN table for an IF card #3 in an operational example according to the first embodiment. FIG. 13I illustrates an exemplary IF-MGID table for an IF card #3 in an operational example according to the first embodiment. FIG. 13J illustrates an exemplary SW-MGID table for an SW card in an operational example according to the first embodiment.

Operation of a communication apparatus 100 in the case where a frame with VLAN ID=10 is received at C0P0 will now be described. Herein it is supposed that the MAC table 23 is in its initial state (all entries invalid).

The VLAN receiver circuit 12 in IF card #0 references the VLAN table 13 for IF card #0 (FIG. 13B), and acquires MGID=1 from the entry indexed by VLAN ID=10 and C0P0. The VLAN receiver circuit 12 in IF card #0 respectively writes IF card #0, port #0, and MGID=1 in the source IF card number, source port number, and MGID fields in the local header of the receive frame, and transmits the result to the SW card.

The MAC table control circuit 22 in the SW card acquires the MAC table 23 entry indexed by the VLAN ID and destination MAC address contained in the receive frame. Since the MAC table 23 is in its initial state and all entries are invalid, the MAC table control circuit 22 in the SW card overwrites the M bit with 1 in the local header of the receive frame. Doing so specifies that the receive frame is a multicast frame. In addition, the MAC table control circuit 22 adds an entry corresponding to the VLAN ID and source MAC address contained in the receive frame to the MAC table 23.

Next, since the receive frame has an M bit of 1, or in other words is a multicast frame, the receive frame is transmitted to the frame copy control circuit 24 of the SW card. The frame copy control circuit 24 in the SW card acquires the IF cards with ports participating in the multicast group with MGID=1 from the entry corresponding to MGID=1 in the SW-MGID table 25 (FIG. 13J). The IF cards acquired at this point are the IF card #0, the IF card #1, the IF card #2, and the IF card #3. The frame copy control circuit 24 copies the receive frame, respectively sets IF card #0, IF card #1, IF card #2, and IF card #3 as the destination IF card number in the local header of each copy of the frame, and transmits them to the SW circuit 21.

The copies of the receive frame are respectively transmitted to the IF card #0, the IF card #1, the IF card #2, and the IF card #3 by the SW circuit 21 in accordance with the destination IF card numbers in their local headers.

In the IF card #1, the IF card #2, and the IF card #3, the IF copy deterrence circuit 14 determines that the source IF card number (IF card #0) does not match the destination IF card number (IF card #1, #2, or #3) in the local header of the receive frame. The frame copy control circuit 15 acquires the ports whose corresponding fields are set a value of 1 from the read value of the entry corresponding to MGID=1 retrieved from the IF-MGID table 16 (FIGS. 13E, 13G, and 13I). The frame copy control circuit 15 copies the receive frame, respectively updates the destination port numbers in the local headers of the receive frame copies with the acquired port numbers, and transmits the copies of the receive frame through the corresponding ports. In so doing, frames are multicast from C1P1, C2P0, C3P0, and C3P1.

In the IF card #0, the IF copy deterrence circuit 14 determines that the source IF card number (IF card #0) matches the destination IF card number (IF card #0) in the local header of the receive frame. The IF copy deterrence circuit 14 writes 0 over the value in the field corresponding to port #0 in the read value of the MGID=1 entry in the IF-MGID table 16 (FIG. 13C) retrieved by the frame copy control circuit 15. Port #0 is the port indicated by the port number stored in the source port number field in the local header of the receive frame. Consequently, the read value of the MGID=1 entry in the IF-MGID table 16 (FIG. 13C) retrieved by the frame copy control circuit 15 indicates that the IF card #0 does not have any ports participating in the multicast group with MGID=1. Consequently, the receive frame is not transmitted from any port in the IF card #0.

According to the above, frames are transmitted to all ports belonging to a VLAN with VLAN ID=10 in a communication apparatus 100 in the case of flooding the VLAN with VLAN ID=10 (a multicast group with MGID=1) in the communication apparatus 100. However, processing by the IF copy deterrence circuit 14 deters frame copying for the receive port, and a frame is not transmitted from the receive port. In so doing, the communication apparatus 100 is able to transmit frames to only the other ports belonging to the VLAN excepting the receive port, without making unwanted copies of the frame.

Next, the case where C0P1 is added to a VLAN with VLAN ID=10 will be described. C0P1 is added to the VLAN with VLAN ID=10 and the multicast group with MGID=1 by input provided to a communication apparatus 100 from a management terminal. In this case, the control processor 104 in the IF card #0 acts according to instructions from a control processor in the control card 3 to set the entry indexed by port #1 and VLAN ID=10 as valid in the VLAN table 13 for the IF card #0. In this entry, values of 1 are stored in the V bit and MGID fields. Also, the control processor 104 in the IF card #0 updates the IF-MGID table 16 for the IF card #0 such that a value of 1 is stored in the field corresponding to port #1 in the MGID=1 entry, which indicates that C0P1 is participating in the multicast group with MGID=1.

As above, in the case of adding C0P1 to a VLAN with VLAN ID=10, the VLAN table 13 and the IF-MGID table 16 are updated in the IF card #0 that includes C0P1. Processing related to adding a port to the VLAN is not conducted in the other IF card #1, IF card #2, IF card #3, and the SW card. In the case of deleting a port from a VLAN, the corresponding entry is invalidated in the VLAN table 13 and the corresponding entry is updated in the IF-MGID table 16 for only the IF card that includes the port to be deleted, while no processing is conducted at the other cards. Also, in the case of adding or deleting a VLAN itself, processing to add or delete an entry for the MGID corresponding to the relevant VLAN in the SW-MGID table 25 of the SW card 2 is conducted in addition to the above processing. Likewise in this case, no processing is conducted at IF cards that do not include ports belonging to the VLAN to be added or deleted.

Figure 4:
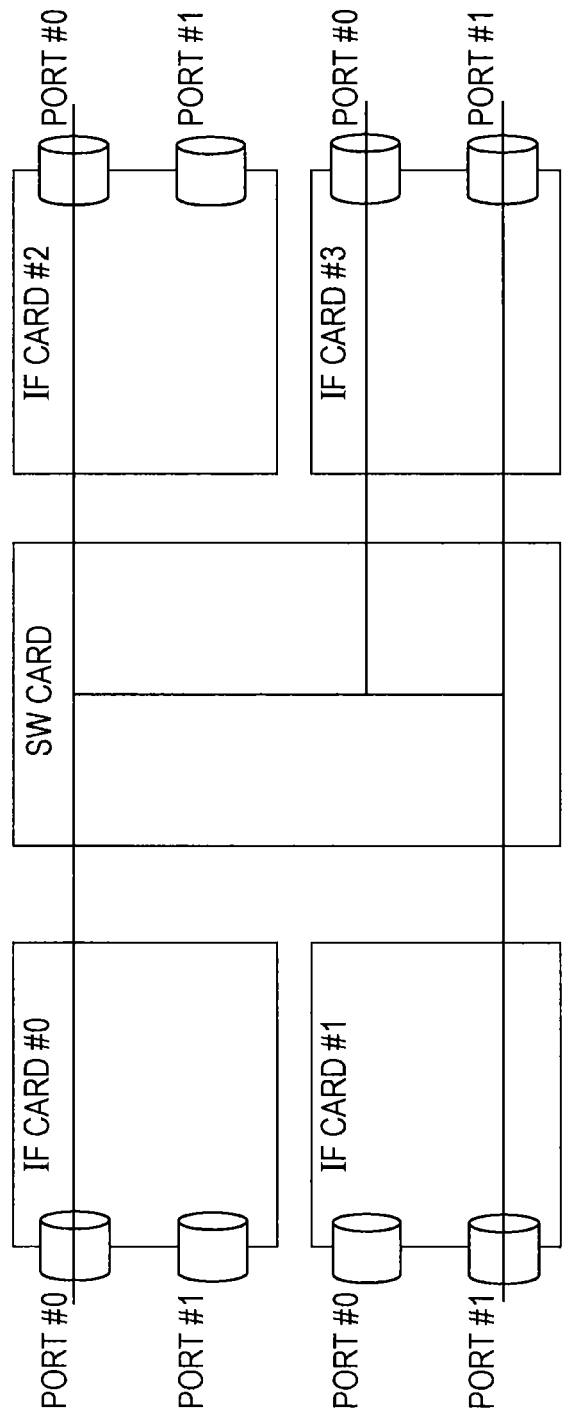
FIG. 4 illustrates an exemplary layout of a VLAN with VLAN ID=10 and exemplary destination information for respective ports belonging to a VLAN with VLAN ID=10 in a communication apparatus.

In the first embodiment, multicast groups are adopted in a communication apparatus 100, with a SW-MGID table 25 being provided in the SW card 2 and a IF-MGID table 16 being provided in each IF card 1. Each IF card 1 manages, for individual multicast groups, which of its own ports are participating in multicast groups. In other words, each IF card 1 manages the destination ports for flooding frames within a multicast group. Meanwhile, the SW card 2 manages, for individual multicast groups, which IF cards 1 have ports participating in multicast groups. In other words, the SW card 2 manages the destination IF cards for flooding frames within a multicast group. Also, each IF card 1 adds source port number information to a local header to deter the transmission of a frame to its source port in an IF card 1. For this reason, as illustrated by FIGS. 13C, 13E, 13G, 13I, and 13J, for example, there is one entry corresponding to one VLAN in each IF-MGID table 16 and the SW-MGID table 25 in the case where a VLAN is taken to be a single multicast group. In contrast, in the related art, destination information for each port belonging to a corresponding VLAN is stored inside a single table for a single VLAN, without distinguishing among IF cards (see FIG. 4). Consequently, according to the first embodiment, it is possible to reduce the number of table entries and the amount of management information utilized in a communication apparatus 100, and thus decrease memory usage. Furthermore, a communication apparatus 100 is able to accommodate more VLANs and ports to the extent that the number of table entries and the amount of management information is reduced.

In the case of flooding, the SW card 2 acquires the IF cards 1 which are to receive copies of a frame according to the SW-MGID table 25, and transmits copies of the frame to the acquired IF cards. Upon receiving a flooding frame from the SW card 2, each IF card 1 acquires the ports which are to receive the frame according to the IF-MGID table 16, and copies of the frame are transmitted to the acquired ports. At this point, one frame is transmitted from the SW card 2 to each IF card, irrespective of the number of ports belonging to the corresponding multicast group in each IF card. In the case of flooding according to the related art, the SW card 2 copies the frame a number of times equal to the number of ports which are to receive the frame, and then transmits the copies to the IF cards 1. For this reason, the number of frames transmitted from the SW card 2 to a particular IF card 1 becomes equal to the number of recipient ports in that IF card 1. Consequently, according to the first embodiment, it is possible to save wasted bandwidth on the data bus connecting the SW card 2 with the IF cards 1.

When adding or deleting VLAN ports in a communication apparatus 100 according to the first embodiment, various tables are updated in the IF card 1 that includes the ports to be added to or deleted from the VLAN, whereas no processing is conducted at the other IF cards 1. Also, in the IF card 1 that includes the corresponding ports, the numbers of entries which are updated in the VLAN table 13 and the IF-MGID table 16 are respectively equal to the number of corresponding ports. In so doing, it is possible to reduce the control processor and software-related processing load and management load in a communication apparatus 100.

In the case of multicast forwarding in the IF cards 1, a copy deterrence determination is made in the IF copy deterrence circuit 14 before the frame copy control circuit 15 makes copies of the receive frame. In so doing, it is possible to avoid the retransmission of a frame from its receive port. In addition, unwanted copies of frames can be reduced, making it possible to reduce copy processing and the amount of frames in a communication apparatus 100. However, an embodiment is not limited to the above, and the IF copy deterrence circuit 14 may also make a copy deterrence determination after the frame copy control circuit 15 makes copies of a frame in a communication apparatus 100.

In the case where a communication apparatus 100 processes a frame that is double-tagged with VLAN tags, the index of the VLAN table 13 becomes the receive port plus the VLAN ID of the first VLAN tag plus the VLAN ID of the second VLAN tag. Alternatively, in the case where the memory space for the VLAN table 13 is limited, for example, entries in the VLAN table 13 may be an association between an MGID and the result of a hash calculation performed on the combination of the VLAN ID of the first VLAN tag and the VLAN ID of the second VLAN tag. In this case, by registering just the combinations of VLAN IDs which are anticipated for use as entries in the VLAN table 13, it is possible to effectively utilize limited space in a VLAN table.

Second Embodiment

In a communication apparatus according to the second embodiment, superfluous frame forwarding from the SW card to the IF cards is avoided. One example of superfluous frame forwarding may occur in the case of flooding, in which copies of a frame are transmitted from the SW card 2 to an IF card 1 which only has one receive port participating in the corresponding multicast group to receive that frame. In the second embodiment, the description of features shared with the first embodiment will be reduced or omitted.

Figure 14:
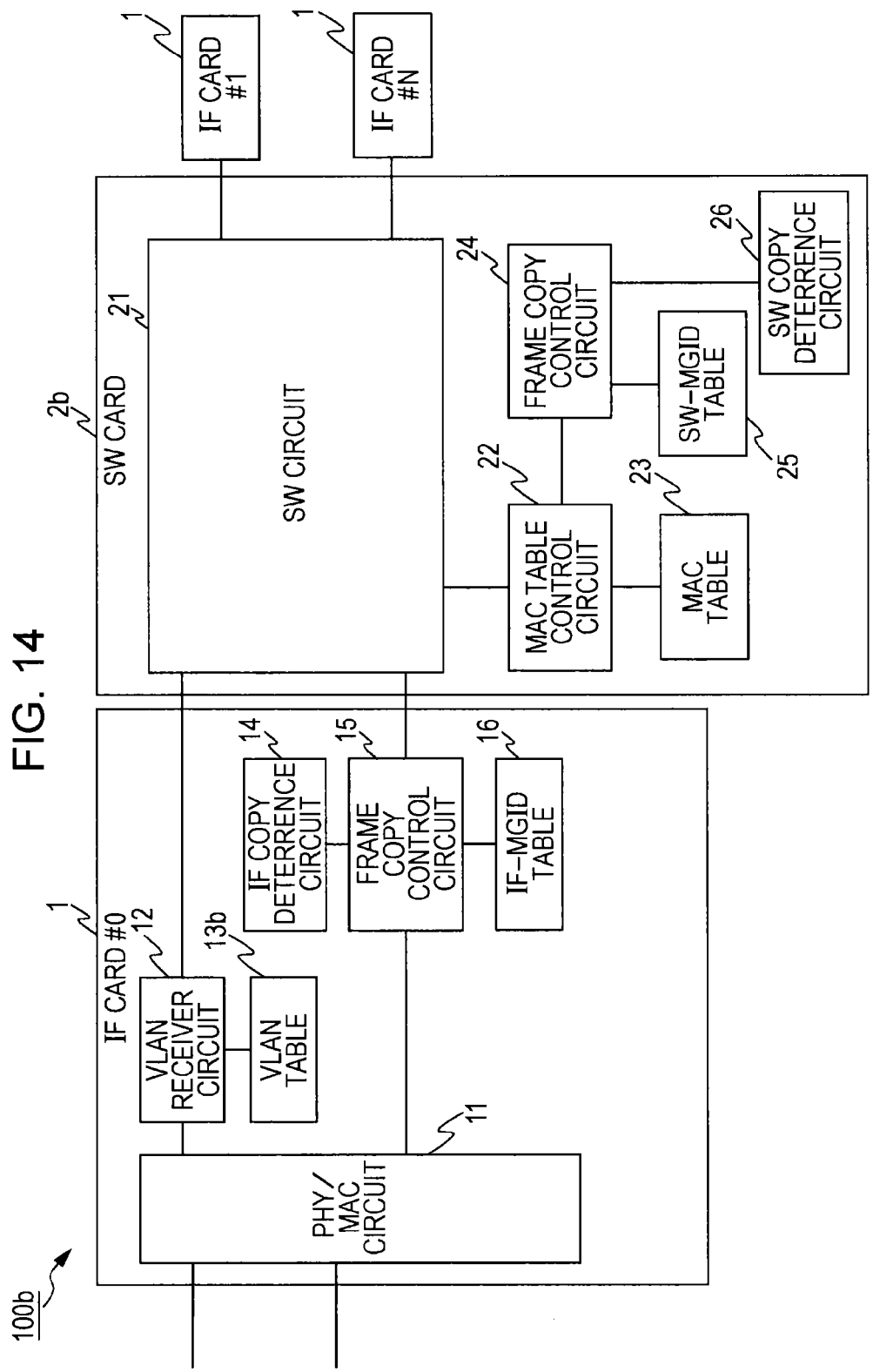
FIG. 14 illustrates examples of circuits and tables respectively included in an IF card and an SW card in a communication apparatus according to the second embodiment.

FIG. 14 illustrates examples of circuits and tables respectively included in an IF card 1 and a SW card 2b in a communication apparatus 100b according to the second embodiment. The SW card 2b in the communication apparatus 100b includes a SW copy deterrence circuit 26 in addition to the SW circuit 21, MAC table control circuit 22, and frame copy control circuit 24.

The SW copy deterrence circuit 26 is a circuit that deters the transmission of copies of a receive frame to the source IF card of that receive frame, as well as to IF cards which only have one port belonging to the multicast group with the corresponding MGID. When the frame copy control circuit 24 receives a multicast frame, the SW copy deterrence circuit 26 executes a process for deterring transmission of copies of the receive frame. Details will be described with FIG. 17. The SW copy deterrence circuit 26 is an example of a "second deterrence circuit".

The SW copy deterrence circuit 26 may be a function realized by the execution of various software stored in the memory 202 by the data processor 206 illustrated in FIG. 5, for example. However, the configuration is not limited thereto, and the SW copy deterrence circuit 26 may also be a circuit realized with one or a plurality of IC logic elements or FPGAs, etc. not illustrated in FIG. 5, for example. For this reason, similarly to FIG. 6, the SW copy deterrence circuit 26 is illustrated as a circuit in FIG. 14 and is described as such for the sake of convenience, even in the case where the above is a function realized by the execution of software by the data processor 206.

Figure 15:
FIG. 15 illustrates an exemplary VLAN table according to the second embodiment.

FIG. 15 illustrates an exemplary VLAN table 13b according to the second embodiment. In the VLAN table 13b according to the second embodiment, each entry includes a copy deterrence bit in addition to the V bit and the MGID. The copy deterrence bit indicates that an IF card 1 only has one port participating in the multicast group with the corresponding MGID, while also indicating that the transmission of copies of a corresponding frame to that IF card 1 is to be deterred. In the second embodiment, a copy deterrence bit value of 1 indicates that the transmission of copies of a corresponding frame to that IF card 1 (the IF card 1 indicated by the source IF card number in the local header) is to be deterred. Meanwhile, in the second embodiment, a copy deterrence bit value of 0 indicates that the transmission of copies of a corresponding frame to that IF card 1 (the IF card 1 indicated by the source IF card number in the local header) is not to be deterred. The copy deterrence bit in the VLAN table 13b is set in entries in the VLAN table 13b, and is additionally set by the control processor 104. The copy deterrence bit is an example of "copy deterrence information".

Figure 16:
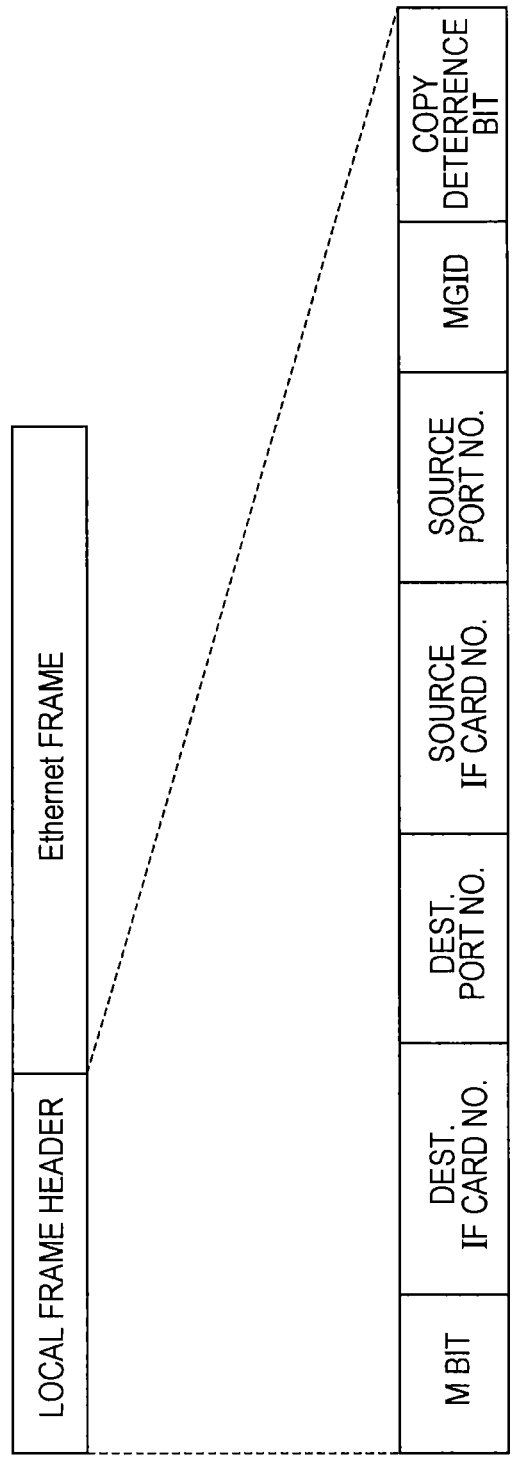
FIG. 16 illustrates an exemplary local frame header format according to the second embodiment.

FIG. 16 illustrates an exemplary local frame header format according to the second embodiment. A local header according to the second embodiment includes a copy deterrence bit field in addition to the M bit, destination IF card number, destination port number, source IF card number, source port number, and MGID fields.

In the copy deterrence bit field of the local header, the VLAN receiver circuit 12 stores the value (0 or 1) of the copy deterrence bit contained in the VLAN table 13b entry corresponding to that receive frame.

Figure 17:
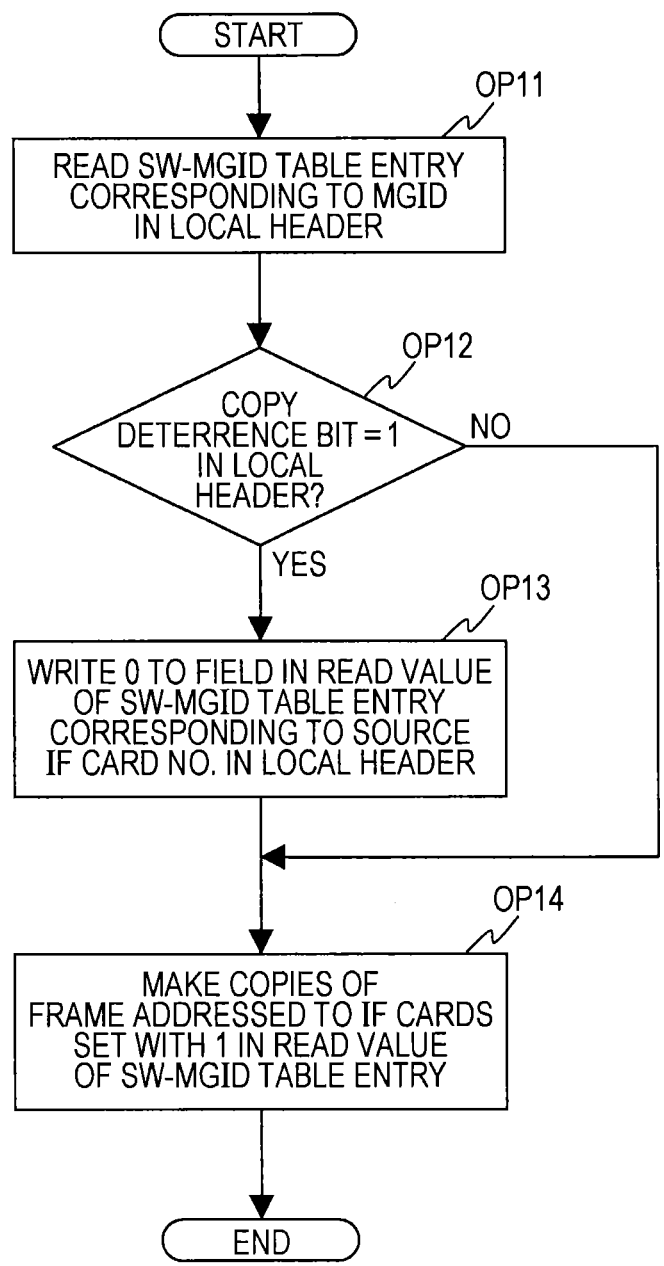
FIG. 17 illustrates an exemplary flowchart of a process conducted by a frame copy control circuit and an SW copy deterrence circuit in an SW card.

FIG. 17 illustrates an exemplary flowchart of a process conducted by the frame copy control circuit 24 and the SW copy deterrence circuit 26 in the SW card 2b. The flowchart illustrated in FIG. 17 is initiated when the frame copy control circuit 24 receives from the MAC table control circuit 22 a frame with an M bit of 1, or in other words, a multicast frame.

In OP11, the frame copy control circuit 24 acquires the SW-MGID table 25 entry indexed by the MGID contained in the local header of the receive frame, and stores the acquired entry in memory included in the frame copy control circuit 24 (or in the memory 202). This SW-MGID table 25 entry stored in memory will be referred to as the read value of the SW-MGID table 25 entry, or simply the read value. The process then proceeds to OP12.

In OP12, the SW copy deterrence circuit 26 determines whether or not the copy deterrence bit contained in the local header of the receive frame has a value of 1. If the copy deterrence bit is 1 (OP12: Yes), this indicates that the transmission of frame copies to the IF card 1 indicated by the source IF card number contained in the local header is to be deterred. In this case, the process proceeds to OP13. If the copy deterrence bit is 0 (OP12: No), this indicates that frame copies are to be transmitted to the IF card 1 indicated by the source IF card number contained in the local header. In this case, the process proceeds to OP14.

In OP13, the SW copy deterrence circuit 26 writes 0 over the value in the field corresponding to the IF card 1 indicated by the source IF card number of the local header in the read value of the SW-MGID table 25 entry being stored in memory. In so doing, the read value of the SW-MGID table 25 entry being stored in memory indicates that the corresponding IF card 1 does not have any ports participating in the multicast group with the corresponding MGID. In actuality, however, one port in that IF card 1 (the frame's receive port) is participating in the multicast group with the corresponding MGID. The process then proceeds to OP14.

In OP14, the frame copy control circuit 24 acquires the IF cards 1 whose corresponding fields are set to 1 in the read value of the SW-MGID table 25 entry being stored in memory. The frame copy control circuit 24 respectively stores the numbers of the acquired IF cards in the destination IF card number field of the local header in each copy of the receive frame, and transmits the copies of the receive frame to the SW circuit 21. Upon transmitting copies of the receive frame, the frame copy control circuit 24 deletes the read value of the SW-MGID table 25 entry from memory. After that, the flowchart illustrated in FIG. 17 ends.

<Operational Example>

The settings for an communication apparatus 100b in an operational example according to the second embodiment are similar to those of the example illustrated in FIG. 13A. FIG. 18A illustrates an exemplary VLAN table for an IF card #0 in an operational example according to the second embodiment. FIG. 18B illustrates an exemplary IF-MGID table for an IF card #0 in an operational example according to the second embodiment. FIG. 18C illustrates an exemplary VLAN table for an IF card #1 in an operational example according to the second embodiment. FIG. 18D illustrates an exemplary IF-MGID table for an IF card #1 in an operational example according to the second embodiment. FIG. 18E illustrates an exemplary VLAN table for an IF card #2 in an operational example according to the second embodiment. FIG. 18F illustrates an exemplary IF-MGID table for an IF card #2 in an operational example according to the second embodiment. FIG. 18G illustrates an exemplary VLAN table for an IF card #3 in an operational example according to the second embodiment. FIG. 18H illustrates an exemplary IF-MGID table for an IF card #3 in an operational example according to the second embodiment. Herein, the SW-MGID table in the SW card in an operational example according to the second embodiment is similar to that of FIG. 13J.

Operation of a SW card in the case where a frame with VLAN ID=10 is received at C0P0 will now be described. Similarly to the operational example for the first embodiment, herein it is supposed that the MAC table 23 is in its initial state (all entries invalid). Hereinafter, the description of processes shared with the operational example for the first embodiment will be reduced or omitted.

The frame copy control circuit 24 in the SW card receives a frame with an M bit of 1, or in other words, a multicast frame. The receive port for this frame is C0P0. The frame copy control circuit 24 in the SW card acquires the entry corresponding to MGID=1 in the SW-MGID table 25 (FIG. 13J), and stores the acquired entry in memory.

Next, in the read value of the SW-MGID table 25 entry with MGID=1, the SW copy deterrence circuit 26 in the SW card writes 0 over the value in the field that corresponds to the IF card #0 indicated by the source IF card number field in the local header of the receive frame. In so doing, the read value of the SW-MGID table 25 entry with MGID=1 indicates that the IF card #0 does not have any ports participating in the multicast group with MGID=1. In actuality, however, port #0 in the IF card #0 is participating in the multicast group with MGID=1.

The frame copy control circuit 24 in the SW card acquires IF card #1, IF card #2, and IF card #3 as the IF cards whose corresponding fields have a value of 1 in the read value of the SW-MGID table 25 entry with MGID=1 that is stored in memory. The frame copy control circuit 24 copies the receive frame, respectively sets IF card #1, IF card #2, and IF card #3 as the destination IF card number in the local header of each copy of the frame, and transmits them to the SW circuit 21.

The copies of the receive frame are respectively transmitted to the IF card #1, the IF card #2, and the IF card #3 by the SW circuit 21 in accordance with the destination IF card numbers in their local headers.

As above, in the present embodiment, a copy of the receive frame is not forwarded from the SW card to the IF card #0 that includes the receive port. In so doing, the communication apparatus 100b is able to avoid superfluous frame forwarding from the SW card 2b to the IF cards 1.

In a communication apparatus 100b according to the second embodiment, a copy deterrence bit is used in the SW card 2b to determine whether or not to deter transmitting a copy of a frame to an IF card 1. In so doing, the communication apparatus 100b is able to avoid transmitting superfluous copies of frames from the SW card 2b to the IF cards 1, and thus save bandwidth on the data bus 6 (FIG. 5) connecting the SW card 2b to the IF cards 1.

Third Embodiment

In the first and second embodiments, a frame received from a SW card is discarded for the IF card that includes the receive port in order to avoid the retransmission of the same frame from the receive port that received the frame. In the third embodiment, a communication apparatus avoids retransmitting a unicast frame from the SW card to the IF card that includes the receive port for the frame (the source IF card). Herein, in the third embodiment, the description of features shared with the first or second embodiment will be reduced or omitted.

FIG. 19 illustrates examples of circuits and tables respectively included in an IF card 1 and a SW card 2c in a communication apparatus 100c according to the third embodiment. In the third embodiment, the SW card 2c includes a transmission filter circuit 27 in addition to the SW circuit 21, MAC table control circuit 22, frame copy control circuit 24, and SW copy deterrence circuit 26. The transmission filter circuit 27 is a circuit for avoiding the forwarding of unicast frames to their source IF cards 1. The transmission filter circuit 27 is an example of a "filter circuit".

The transmission filter circuit 27 may be a function realized by the execution of various software stored in the memory 202 by the data processor 206 illustrated in FIG. 5, for example. However, the configuration is not limited thereto, and the transmission filter circuit 27 may also be a circuit realized with one or a plurality of IC logic elements or FPGAs, etc. not illustrated in FIG. 5, for example. For this reason, similarly to FIG. 6, the transmission filter circuit 27 is illustrated as a circuit in FIG. 14 and is described as such for the sake of convenience, even in the case where the above is a function realized by the execution of software by the data processor 206.

FIG. 20 illustrates an exemplary flowchart of a process by the transmission filter circuit 27 in the SW card 2c. The flowchart illustrated in FIG. 20 is initiated when the transmission filter circuit 27 receives from the MAC table control circuit 22 a frame with an M bit of 0 in its local header, or in other words, a unicast frame. Herein, the destination IF card number and destination port number in the local header of the unicast frame are acquired from the MAC table 23 by the MAC table control circuit 22 and stored. The MAC address is an example of "identification information for terminal". The memory 202 that stores the MAC table 23 is an example of "third memory". The MAC table control circuit 22 is an example of an "acquisition circuit".

In OP31, the transmission filter circuit 27 determines whether or not the source IF card number and source port number match the destination IF card number and destination port number in the local header of the unicast frame. In the case where the source IF card number and source port number match the destination IF card number and destination port number in the local header (OP31: Yes), the process proceeds to OP32. In the case where the source IF card number and source port number do not match the destination IF card number and destination port number in the local header (OP31: No), the process proceeds to OP33.

In OP32, the transmission filter circuit 27 discards the unicast frame. In other words, in the case where the source and destination of the unicast frame match, the transmission filter circuit 27 does not forward that frame to the IF card 1 that includes the source port. In so doing, it is possible to avoid transmitting a unicast frame from the SW card 2c to the IF card 1 that includes the source port for that frame. After that, the flowchart illustrated in FIG. 20 ends.

In OP33, the transmission filter circuit 27 forwards the unicast frame to the SW circuit 21. The SW circuit 21 transmits the unicast frame to the IF card indicated by the destination IF card number in its local header. After that, the flowchart illustrated in FIG. 20 ends.

In the third embodiment, the transmission filter circuit 27 in the SW card 2c is able to avoid forwarding a unicast frame from the SW card 2c to the IF card 1 that includes the receive port for that frame. In so doing, bandwidth consumption between the SW card 2c and the IF cards 1 can be reduced. Note that although a communication apparatus 100c according to the third embodiment is herein configured by adding a transmission filter circuit 27 to a communication apparatus 100b according to the second embodiment, the configuration is not limited thereto, and a communication apparatus may also be configured by adding a transmission filter circuit 27 to a communication apparatus 100 according to the first embodiment.

Fourth Embodiment

In the fourth embodiment, the copying of frames is conducted at the SW card in a centralized manner, without being conducted at the IF cards. Note that in the fourth embodiment, the description of features shared with the first, second, or third embodiment will be reduced or omitted.

Figure 21:
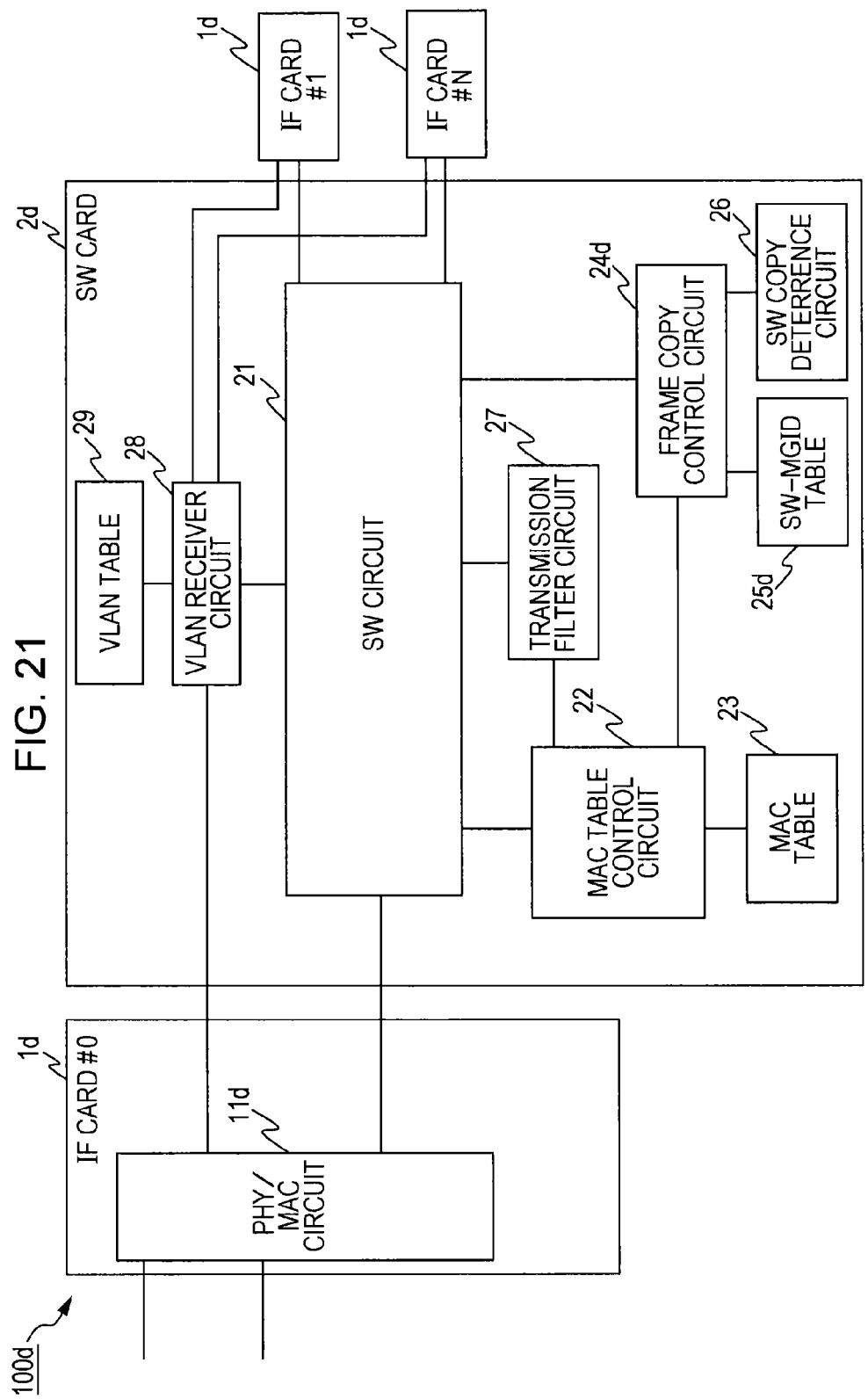
FIG. 21 illustrates examples of circuits and tables respectively included in an IF card and an SW card in a communication apparatus according to the fourth embodiment.

FIG. 21 illustrates examples of circuits and tables respectively included in an IF card 1d and a SW card 2d in a communication apparatus 100d according to the fourth embodiment. In the fourth embodiment, an IF card 1d includes a PHY/MAC circuit 11d. Also, in the fourth embodiment, the SW card 2d includes VLAN receiver circuit 28 in addition to the SW circuit 21, MAC table control circuit 22, frame copy control circuit 24*d*, SW copy deterrence circuit 26, and transmission filter circuit 27. The SW card 2*d* of the communication apparatus 100*d* according to the fourth embodiment also includes a VLAN table 29 in addition to the MAC table 23 and SW-MGID table 25*d*. The VLAN receiver circuit 28 in the SW card 2*d* conducts processing equivalent to that of the VLAN receiver circuit 12 in an IF card according to the first through third embodiments. In addition, the VLAN table 29 in the SW card 2*d* is a table equivalent to the VLAN table in an IF card according to the first through third embodiments.

FIG. 22 illustrates an exemplary VLAN table 29 according to the fourth embodiment. The VLAN table 29 uses the combination of IF card number, port number, and VLAN ID as the index for each entry. Each entry in the VLAN table 29 includes V bit and MGID fields. In the fourth embodiment, an entry is indicated as valid in the case where 1 is stored in its V bit. Meanwhile, an entry is indicated as invalid in the case where 0 is stored in its V bit.

An address area corresponding to all combinations of card numbers, port numbers, and VLAN IDs is reserved for the VLAN table 29 in the memory 202 of the SW card 2*d*, for example. Each entry in the VLAN table 29 may be set by the control processor 203 according to input from a management terminal, for example.

FIG. 23 illustrates an exemplary SW-MGID table 25*d* according to the fourth embodiment. The SW-MGID table 25*d* stores which ports in each IF card 1*d* belong to respective multicast groups. The SW-MGID table 25*d* uses the MGID as the index for each entry. In each entry in the SW-MGID table 25*d*, individual fields are associated with individual ports in respective IF cards 1*d*. The field corresponding to a particular port in an IF card 1*d* stores a value which indicates whether or not that port is participating in the multicast group with the corresponding MGID. In the fourth embodiment, a value of 0 being set in a field corresponding to a particular port in an IF card 1*d* indicates that the corresponding port is not participating in the corresponding multicast group. Meanwhile, in the fourth embodiment, a value of 1 being set in a field corresponding to a particular port in an IF card 1*d* indicates that the corresponding port is participating in the corresponding multicast group. In other words, when flooding with a receive frame, copies of the receive frame are transmitted to ports whose corresponding fields are set to 1 in the entry of the SW-MGID table 25*d* that corresponds to the MGID contained in the local frame header of the receive frame.

An MGID address area sufficient for the SW-MGID table 25*d* is reserved in the memory 202 of the SW card 2*d*. Entries in the SW-MGID table 25*d* may be set by the control processor 203 in FIG. 5 according to input from a user, for example.

Returning to FIG. 21, processing by respective circuits according to the fourth embodiment will now be described. The PHY/MAC circuit 11*d* in an IF card 1*d* adds and removes local headers. Upon receiving a frame, the PHY/MAC circuit 11*d* writes the number of the IF card 1*d* itself that received the receive frame and the port number where the receive frame was received into the source IF card number and source port number fields of the local header (see FIG. 11). At this point, the M bit, destination IF card number, destination port number, and MGID fields of the local header are left blank. The frame with the added local header is transmitted to the SW card 2*d*.

Upon receiving a frame from an IF card 1*d*, the VLAN receiver circuit 28 in the SW card 2*d* references the VLAN table 29 and acquires the entry whose index matches the source card number and source port number in the local header as well as the VLAN ID indicated by the VLAN tag in the receive frame.

A V bit of 0 indicates that the corresponding entry is invalid, and in this case the VLAN receiver circuit 28 discards the receive frame. A V bit of 1 indicates that the corresponding entry is valid, and in this case the VLAN receiver circuit 28 writes information into the local header of the receive frame. Specifically, the VLAN receiver circuit 28 sets the M bit in the local header to its default value of 0 (the value indicating that the multicast group is not to be flooded with that frame). The VLAN receiver circuit 28 writes the MGID acquired from the corresponding entry in the VLAN table 29 into the MGID field of the local header. Note that the destination IF card number and destination port number fields of the local header are left blank. The destination IF card number and destination port number in the local header are written by the MAC table control circuit 22 (in the case of unicasting) or the frame copy control circuit 24*d* (in the case of multicasting). The VLAN receiver circuit 28 transmits the frame with the MGID written therein to the SW circuit 21.

The MAC table control circuit 22 determines whether the frame transmitted to the SW circuit 21 is to be forwarded by unicasting or multicasting. In the case of unicasting the frame, the MAC table control circuit 22 writes the destination IF card number and destination port number into the local header and forwards the frame to the destination IF card. In the case of multicasting the frame, the MAC table control circuit 22 overwrites the M bit in the local header (with the value indicating multicasting), and transmits the frame to the frame copy control circuit 24*d*.

Upon receiving the frame, the frame copy control circuit 24*d* acquires the SW-MGID table 25*d* entry indexed by the MGID contained in the local header of that frame. The frame copy control circuit 24*d* compares the IF card numbers and port numbers set with 1 in the SW-MGID table 25*d* against the source card number and source port number in the local header of the frame, and copies the frame in the case where these numbers do not match. The frame copy control circuit 24*d* does not copy the frame in the case where an IF card number and port number set with 1 in the SW-MGID table 25*d* match the source card number and source port number in the local header of the frame. The frame copy control circuit 24*d* respectively stores the If card numbers and port numbers of ports participating in the multicast group with the corresponding MGID in the destination IF card number and port number fields in the local header of each copy of the frame. However, the frame is not copied for the port that matches the source IF card number and source port number in the local header of the frame. The copied frames are transmitted to the SW circuit 21. The SW circuit 21 transmits each frame to the IF card 1 indicated by the destination IF card number in the local header of that frame. After that, the frames are transmitted from the ports respectively indicated by the destination IF card number and destination port number in each local header.

In the fourth embodiment, a VLAN receiver circuit and a VLAN table are provided in the SW card, and the copying of frames is conducted at the SW card in a centralized manner. Frame copying incurs a high processing load and involves complex circuitry, and thus by centralizing the frame copying process in the SW card, it is possible to simplify the configuration and lower the cost of the IF cards.

Additionally, in the fourth embodiment, the frame copy control circuit 24*d* in the SW card 2*d* does not make a copy of a frame for the port which matches the source IF card number and source port number in the local header of that frame.

Consequently, according to a communication apparatus 100d of the fourth embodiment, it is possible to avoid re-forwarding the same frame to the receive port for that frame. Furthermore, superfluous frame copying can be reduced.

Herein, the fourth embodiment is described for the case of transferring the VLAN receiver circuit and VLAN table from IF card to SW card when given the configuration of the third embodiment. However, the configuration is not limited thereto, and the fourth embodiment is also applicable to the case of transferring the VLAN receiver circuit and VLAN table from IF card to SW card when given the configuration of the first or second embodiment.

Other

The first, second, third, and fourth embodiments have been described by taking the example of applying the present disclosure to a communication apparatus that handles VLANs. However, the present disclosure is also applicable to communication apparatus that conduct multicast communication using IP multicast addresses, for example. In such cases, a corresponding communication apparatus is realizable by substituting suitably correspondent elements in the first through fourth embodiments, such as by substituting VLANs with IP multicast groups, VLAN IDs with IP multicast group IDs, and MAC tables with routing tables, and so forth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
   a plurality of interface circuits each including a plurality of ports and a first memory configured to store group information for each of a plurality of groups in association with information identifying the ports associated with the plurality of groups;
   a switch circuit including:
      a second memory configured to store the group information and information identifying an interface circuit associated with a port associated with a group;
      a bridge circuit configured to transmit data to the plurality of interface circuits,
   wherein each of the plurality of interface circuits includes a first processor configured to:
      add, to data received via a port, source information including identification of an interface circuit corresponding with the port that received the data, and group information, acquired from the first memory, of a group associated with the port which received the data, and transmit the data added with the source information to the switch circuit,
   wherein the switch circuit includes at least a second processor configured to:
      acquire, from the second memory, information of an interface circuit corresponding with the group information indicated by the source information added with the data received,
      copy the received data including the source information and transmit a copy of the received data including the source information to a port of each interface circuit of an acquired information, and
   wherein the first processor is further configured to:
      determine whether the identification of the interface circuit in the source information of the received data matches identification of an interface circuit which received the copy of the received data, wherein when a match is determined, deter further transmission of the copy of the received data, and
      generate data including the copy of the received data and transmit the generated data to a destination port when determining no match between the identification of the interface circuit identified in the source information and the identification of an interface circuit which received the copy of the received data.

2. The communication apparatus according to claim 1, wherein, each of the plurality of interface circuits manages, using the first memory, data of ports participating in multicast groups, and the switch circuit manages, using the second memory, data of interface circuits participating in the multicast groups.

3. The communication apparatus according to claim 1, wherein the first processor creates the generated data by copying the data received from the switch circuit and updating destination port numbers with acquired port numbers in the source information of the copied data, and transmits the generated data for multicasting.

4. The communication apparatus according to claim 1, wherein the first processor is configured to deter generation of data for multicasting by copying data addressed to the interface circuit having the identification which matches the identification of the interface circuit identified in the source information.

5. The communication apparatus according to claim 1, wherein the second processor is configured to determine whether copy deterrence information is added to the received data before the generated data is generated for transmission.

6. The communication apparatus according to claim 1, wherein the switch circuit includes a third memory configured to store destination information that includes identification information for a terminal to which data is to be transferred, identification information for ports connected with the terminal, and identification information for the plurality of interface circuits, and
   wherein the second processor is configured to:
      acquire, from the third memory, identification information for a port connected with the terminal and identification information of an interface circuit associated with the port connected with the terminal, and
      discard data received from the interface circuit when identification information for the port acquired by the third memory matches identification information for the port in the source information.

7. A communication apparatus comprising:
   a plurality of interface circuits, each including a plurality of ports and a first memory configured to store group information for each of a plurality of groups in association with information identifying the ports associated with the plurality of groups;
   a switch circuit including:
      a second memory configured to store the group information and information identifying an interface circuit associated with a port associated with a group;
      a bridge circuit configured to transmit to the plurality of interface circuits,
   wherein each of the plurality of interface circuits includes a first processor configured to:

an addition circuit configured to add, to data received via a port, source information including identification of an interface circuit corresponding with the port that received the data, and group information, acquired from the first memory, of a group associated with the port which received the data, and transmit the data added with the source information to the switch circuit;

wherein the switch circuit includes at least a second processor configured to:

a copy circuit configured to acquire, from the second memory, information of an interface circuit corresponding with the group information indicated by the source information added with the data received;

wherein the received data including the source information is copied, and a copy of the received data including the source information is transmitted to a port of each interface circuit of an acquired information, and wherein the first processor is further configured to:

a first deterrence circuit configured to determine whether the identification of the interface circuit identified in the source information of the received data matches identification of an interface circuit which received the copy of the received data, wherein when a match is determined, deter further transmission of the copy of the received data; and a transmitter circuit configured to transmit generated data including the copy of the received data, to a destination port when determining no match between the identification of the interface identified in the source information and the identification of an interface circuit which received the copy of the received data.

8. The communication apparatus according to claim 7, wherein, each of the plurality of interface circuits manages, using the first memory, data of ports participating in multicast groups, and the switch circuit manages, using the second memory, data of interface circuits participating in the multicast groups.

9. The communication apparatus according to claim 7, wherein the first processor creates the generated data by copying the data received from the switch circuit and updating destination port numbers with acquired port numbers in the source information of the copied data, and transmits the generated data for multicasting.

10. The communication apparatus according to claim 9, wherein the first processor is configured to deter generation of data for multicasting by copying data addressed to the interface circuit having the identification which matches the identification of the interface circuit identified in the source information.

11. The communication apparatus according to claim 10, wherein the second processor is configured to determine whether copy deterrence information is added to the received data before the generated data is generated for transmission.

12. The communication apparatus according to any one of claim 7, wherein the switch circuit includes a third memory configured to store destination information that includes identification information for a terminal to which data is to be transferred, identification information for ports connected with the terminal, and identification information for the plurality of interface circuits, and wherein the second processor is configured to:

acquire, from the third memory, identification information for a port connected with the terminal and identification information of an interface circuit associated with the port connected with the terminal, and discard data received from the interface circuit when identification information for the port acquired by the third memory matches identification information for the port in the source information.

13. A communication method of a communication apparatus including a plurality of interface circuits and a switch circuit, each interface circuit including a plurality of ports, the communication method comprising:

storing, in a first memory, group information for each of a plurality of groups in association with information identifying the ports associated with the plurality of groups;

storing, in a second memory provided to the switch circuit, the group information and information identifying an interface circuit associated with a port associated with a group;

transmitting data to the plurality of interface circuits via a bridge circuit;

wherein each of the plurality of interface circuits includes a first processor configured to:

add, to data received via a port, source information including identification of an interface circuit corresponding with the port that received the data, and group information, acquired from the first memory, of a group associated with the port which received the data, and transmit the data added with the source information to the switch circuit, wherein the switch circuit includes at least a second processor configured to:

acquire, from the second memory, information of an interface circuit corresponding with the group information indicated by the source information added with the data received, copy the received data including the source information and transmit the copy of the received data including the source information to a port of each interface circuit of an acquired information, and wherein the first processor is further configured to:

determine whether the identification of the interface circuit in the source information of the received data matches identification of an interface circuit which received the copy of the received data, wherein when a match is determined, deter further transmission of the copy of the received data, and generate data including the copy of the received data and transmit the generated data to a destination port when determining no match between the identification of the interface identified in the source information and the identification of an interface circuit which received the copy of the received data.

* * * * *

UNITED STATES PATENT AND TRADEMARK OFFICE
CERTIFICATE OF CORRECTION

PATENT NO. : 8,923,291 B2
APPLICATION NO. : 13/665154
DATED : December 30, 2014
INVENTOR(S) : Yasuyuki Mitsumori It is certified that error appears in the above-identified patent and that said Letters Patent is hereby corrected as shown below:

In the Claims

Column 29, Line 56, in Claim 12, after "to" delete "any one of".

Signed and Sealed this
Fifth Day of May, 2015

Michelle K. Lee
*Director of the United States Patent and Trademark Office*